(12) United States Patent
Chun

(10) Patent No.: US 10,509,618 B2
(45) Date of Patent: Dec. 17, 2019

(54) ORGANIC LIGHT EMITTING DIODE DISPLAY DEVICE AND METHOD FOR OPERATING THE SAME

(71) Applicant: LG ELECTRONICS INC., Seoul (KR)

(72) Inventor: Youngho Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/058,652

(22) Filed: Aug. 8, 2018

(65) Prior Publication Data

US 2019/0146744 A1    May 16, 2019

(30) Foreign Application Priority Data

Nov. 13, 2017   (KR) .................... 10-2017-0150830

(51) Int. Cl.
*G06F 3/14*     (2006.01)
*G09G 3/32*     (2016.01)
*G09G 3/3208*   (2016.01)

(52) U.S. Cl.
CPC ......... *G06F 3/1454* (2013.01); *G09G 3/3208* (2013.01); *G09G 2320/0257* (2013.01); *G09G 2320/046* (2013.01); *G09G 2340/04* (2013.01); *G09G 2340/10* (2013.01); *G09G 2340/12* (2013.01); *G09G 2354/00* (2013.01); *G09G 2370/20* (2013.01)

(58) Field of Classification Search
None
See application file for complete search history.

(56) References Cited

U.S. PATENT DOCUMENTS

| | | | |
|---|---|---|---|
| 8,125,569 B2 | 2/2012 | Flores et al. | |
| 9,594,417 B2 | 3/2017 | Hahm et al. | |
| 2007/0064140 A1 | 3/2007 | Kitaura | |
| 2010/0134689 A1 | 6/2010 | Flores et al. | |
| 2011/0069098 A1* | 3/2011 | Lee | G09G 3/3225 345/691 |
| 2012/0038830 A1 | 2/2012 | Flores et al. | |
| 2015/0082058 A1* | 3/2015 | Hahm | G06F 3/1454 713/320 |
| 2016/0253142 A1 | 9/2016 | Choi et al. | |
| 2016/0260413 A1* | 9/2016 | You | G09G 5/003 |
| 2019/0259325 A1* | 8/2019 | Chaji | G06T 7/90 |

* cited by examiner

*Primary Examiner* — Nurun N Flora
(74) *Attorney, Agent, or Firm* — Birch, Stewart, Kolasch & Birch, LLP

(57) ABSTRACT

An OLED display device includes a communication unit to connect with a terminal, a display unit including a pixel including an OLED, and a controller to receive mirroring image data, which corresponds to a screen displayed on the terminal, through the communication unit, to control the display unit to display a mirroring image on an area of the display unit based on the received mirroring image data, and to control the display unit not to display the displayed mirroring image on the area based on an average picture level (APL) of the displayed mirroring image.

20 Claims, 21 Drawing Sheets

ORGANIC LIGHT EMITTING DIODE DISPLAY DEVICE AND METHOD FOR OPERATING THE SAME

CROSS-REFERENCE TO RELATED APPLICATIONS

The present application claims priority under 35 U.S.C. 119 and 35 U.S.C. 365 to Korean Patent Application No. 10-2017-0150830 (filed on, Nov. 13, 2017), which is hereby incorporated by reference in its entirety.

TECHNICAL FIELD

The present disclosure relates to an organic light emitting diode (OLED) display device, and more particularly to an OLED display device and a method for operating the same, capable of preventing an afterimage phenomenon caused by irregular lifespans of elements resulting from the display of a mirroring screen in the OLED display device supporting a screen mirroring function.

BACKGROUND

Recently, as the use of various smart devices and high-resolution large screens as well as televisions has increased, the types of display devices have been diversified. In particular, a variety of flat panel displays (FPDs) have been developed which can further reduce the weight and volume than a so-called cathode ray tube (CRT). Specifically, flat panel displays, such as liquid crystal displays (LCDs), thin film transistor-liquid crystal displays (TFT-LCDs), plasma display panels (PDPs), and electroluminescence devices have attracted attention.

The electroluminescence devices may be classified into an inorganic light emitting diode and an organic light emitting diode (OLED) according to a material of an emitting layer. The OLED is a self-luminous organic material that emits light by itself by using an electroluminescence phenomenon that light is emitted when a current flows through a fluorescent organic compound. The OLED can be driven at a low voltage and can be made light and thin. Additionally, since each device is a luminous type that emits light, light is adjusted by changing a current flowing through each device. Thus, a backlight is not required. An OLED display device implemented with such OLEDs has advantages such as a fast response time, high image quality, high luminescent efficiency, an ultra-thin structure, and a wide viewing angle.

Due to the above advantages, the prospect of the OLED display device is bright, and the demand for the OLED display device is increasing.

In the OLED display device, as each of elements emits light, the elements may be varied in use frequency and thus the lifespans of the elements may be varied.

Meanwhile, as a terminal such as a smartphone or a tablet PC is extensively spread, a display device has supported a screen mirroring function (for example, Miracast, or the like) of displaying, on a display unit, a mirroring image corresponding to a screen which is being displayed on a terminal. In general, the mirroring image may be fixedly displayed on a specific region (for example, a right upper end of the display unit) of the display unit. The mirroring image may have a higher frequency in including a still image, as compared with a broadcast image. Since an OLED element corresponding to a higher brightness region of the mirroring image continuously emits high-brightness light, the OLED element may have a lifespan reduced more rapidly than an OLED element provided in another region. When the lifespan of the element corresponding to the higher brightness region is rapidly reduced, the brightness of light emitted from the device may be relatively reduced.

Accordingly, the afterimage image is caused on a screen of an OLED display device due to the brightness difference from an element in another region and thus a user may feel inconvenient in viewing an image through the OLED display device, thereby serving as a main cause of degrading the reliability of a product.

SUMMARY

The present disclosure is to provide an OLED display device capable of preventing an afterimage phenomenon caused by the reduction in a lifespan of an OLED element in a specific region due to the mirroring image displayed on the specific region of a display unit as a screen mirroring function is executed.

The present disclosure is to provide an OLED display device capable of changing the display state of a mirroring image automatically or through simple manipulation.

According to an embodiment of the present disclosure, an organic light emitting diode (OLED) display device includes a communication unit to connect with a terminal, a display unit including a pixel including an OLED, and a controller to receive mirroring image data, which corresponds to a screen displayed on the terminal, through the communication unit, to control the display unit to display a mirroring image on an area of the display unit based on the received mirroring image data, and to control the display unit not to display the displayed mirroring image on the area based on an average picture level (APL) of the displayed mirroring image.

The controller may acquire an APL of a frame of the mirroring image from the mirroring image data, may calculate an APL variation by comparing the acquired APL with a previously-acquired APL, and may control the display unit not to display the displayed mirroring image, based on the calculated APL variation.

According to an embodiment, the controller may control the display unit to maintain displaying the mirroring image when the acquired APL is less than the reference APL, and may control the display unit not to display the displayed mirroring image, based on the APL variation when the acquired APL is equal to or greater than a reference APL.

According to an embodiment, the controller may acquire an APL at a predetermined frame interval of the mirroring image, and may control the display unit not to display the displayed mirroring image, when maintaining, for a threshold time, a state that the APL variation between the acquired APL and the previously-acquired APL is less than a reference variation.

According to an embodiment, the controller may display a broadcast image, which is received from a broadcast reception unit, on the display unit, may display the mirroring image by overlaying the mirroring image with the area of the broadcast image, and may display an overlaid portion of the broadcast image on the area, by controlling the display unit not to display the mirroring image displayed on the area.

According to an embodiment, the controller may adjust a transparency of the mirroring image, based on a time for maintaining the state that the APL variation is less than the reference variation.

According to an embodiment, the controller may display a broadcast image, which is received from a broadcast reception unit, on a first region of the display unit, may display the mirroring image on the area which is not overlapped with the first region of the display unit, and may increase a size of the first region and reduces a size of the area as a time for maintaining the state that the APL variation is less than the reference variation is increased.

According to an embodiment, the controller may display a screen protection image on the area, when the controller controls the display unit not to display the mirroring image on the area.

According to an embodiment, the controller may periodically acquires an APL of the mirroring image, may increase a count when an APL variation between the acquired APL and the previously-acquired APL is less than a reference variation, and may control the display unit not to display the displayed mirroring image, when the count arrives at a threshold count or exceeds the threshold count.

When controlling the display unit not to display the displayed mirroring image, the controller may acquire an APL of the mirroring image at a predetermined frame interval based on the mirroring image data received from the terminal, and may control the display to display the mirroring image on the area, based on an APL variation between the acquired APL and the previously-acquired APL.

According to an embodiment, the controller may, when controlling the display unit not to display the displayed mirroring image, control the display unit to display the mirroring image, in response to a wake-up signal received from the terminal as a state of the terminal is changed.

According to an embodiment, the controller may further display a mirroring menu on the display unit, and after controlling the display unit not to display the displayed mirroring image, may control the display unit to display the mirroring image in response to a selection input of the mirroring menu.

According to an embodiment of the present disclosure a method for operating an OLED display device, includes receiving mirroring image data, which corresponds to a screen displayed on a terminal connected with the OLED display device, from the terminal, controlling the display unit to display a mirroring image on an area of the display unit based on the received mirroring image data, and controlling the display unit not to display the displayed mirroring image, based on an APL of the mirroring image.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an intelligent display device that adds a computer supporting function to a broadcast receiving function, can have an easy-to-use interface such as a writing input device, a touch screen, or a spatial remote control device as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present disclosure, for example, can perform various user-friendly functions. The display device, in more detail, can be network TV, HBBTV, smart TV, LED TV, OLED TV, and so on and in some cases, can be applied to a smartphone.

Figure 1:
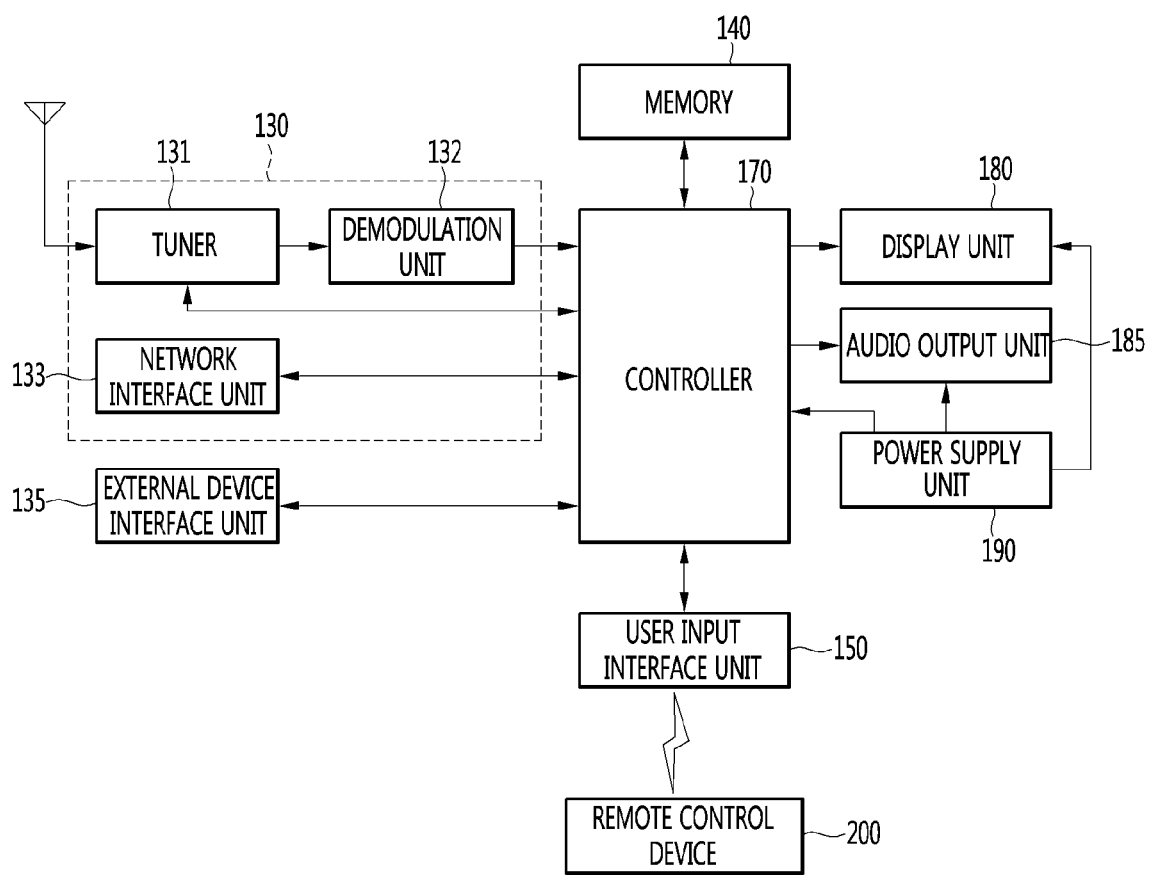
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, the display device 100 may include a broadcast reception unit 130, an external device interface unit 135, a memory 140, a user input interface unit 150, a controller 170, a short-range communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list of an adjacent external device and transfer the application or the application list to the controller 170 or the memory 140.

The external device interface unit 135 may provide a connection path between the display device 100 and the external device. The external device interface unit 135 may receive an image and/or an audio outputted from the external device and transfers the image and/or the audio to the controller 170. The external device connectable to the external device interface unit 135 may be one of a set-top box, a Blu-ray player, a DVD player, a game console, a sound bar, a smartphone, a PC, a USB memory, and a home theater system.

The network interface unit 133 may provide an interface for connecting the display device 100 to a wired/wireless network including an Internet network. The network interface unit 133 may transmit or receive data to or from another user or another electronic device through an accessed network or another network linked to the accessed network.

Additionally, the network interface unit 133 may transmit a part of content data stored in the display device 100 to a user or an electronic device selected from other users or other electronic devices preregistered in the display device 100.

The network interface unit 133 may access a predetermined webpage through the accessed network or another network linked to the accessed network. That is, the network interface unit 133 may access the predetermined webpage through the network and transmit or receive data to or from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided from the content provider or the network operator through the network.

Additionally, the network interface unit 133 may receive update information and update files of firmware provided by the network operator and may transmit data to the Internet or content provider or the network operator.

The network interface unit 133 may select and receive a desired application among applications, which are open to the public, through the network.

The memory 140 may store a program for signal processing and control in the controller 170 and may store signal-processed image, voice, or data signals.

Additionally, the memory 140 may perform a function for temporarily storing image, voice, or data signals inputted from the external device interface unit 135 or the network interface unit 133 and may store information on a predetermined image through a channel memory function.

The memory 140 may store an application or an application list inputted from the external device interface unit 135 or the network interface unit 133.

The display device 100 may reproduce content files (e.g., moving image files, still image files, music files, document files, application files, etc.) stored in the memory 140 so as to provide the content files to the user.

The user input interface unit 150 may transfer signals inputted by the user to the controller 170 or may transfer signals from the controller 170 to the user. For example, the user input interface unit 150 may receive and process control signals such as power on/off, channel selection, or screen setup from the remote control device 200 or may transmit control signals from the controller 170 to a remote control device 200, according to various communication methods such as Bluetooth, Ultra Wideband (WB), ZigBee, Radio Frequency (RF) communication scheme, or infrared (IR) communication scheme.

Additionally, the user input interface unit 150 may transfer, to the controller 170, control signals inputted from local keys (not shown) such as a power key, a channel key, a volume key, and a setting key.

Image signals that are image-processed by the controller 170 may be inputted to the display unit 180 and displayed as an image corresponding to the image signals. Additionally, image signals that are image-processed by the controller 170 may be inputted to an external output device through the external device interface unit 135.

Voice signals that are processed by the controller 170 may be outputted as audio to the audio output unit 185. Additionally, image signals that are processed by the controller 170 may be inputted to an external output device through the external device interface unit 135.

In addition, the controller 170 may control an overall operation of the display device 100.

Additionally, the controller 170 may control the display device 100 by a user command inputted through the user input interface unit 150 or an internal program and may connect to the network to download an application or an application list desired by the user into the display device 100.

The controller 170 may output channel information selected by the user through the display unit 180 or the audio output unit 185 together with the processed image or voice signals.

Additionally, the controller 170 may output the image signal or the voice signal, which is inputted from the external device (e.g., a camera or a camcorder) through the external device interface unit 135, to the display unit 180 or the audio output unit 185 according to an external device image reproduction command received through the user input interface unit 150.

On the other hand, the controller 170 may control the display unit 180 to display images. For example, the controller 170 may control the display unit 180 to display broadcast images inputted through the tuner 131, external input images inputted through the external device interface unit 135, images inputted through the network interface unit, or images stored in the memory 140. In this case, an image displayed on the display unit 180 may be a still image or video, and may be a 2D image or a 3D image.

Additionally, the controller 170 may perform control to reproduce content stored in the display device 100, received broadcast content, or external input content inputted from the outside. The content may be various types, such as a broadcast image, an external input image, an audio file, a still image, a connected web screen, a document file, and the like.

The short-range communication unit 173 may perform a wired or wireless communication with an external device. The short-range communication unit 173 may perform short-range communication with an external device. To this end, the short-range communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or interworking) with the display device 100. The short-range communication unit 173 can detect (or recognize) a communicable wearable device around the display device 100. Furthermore, if the detected wearable device is a device authenticated to communicate with the display device 100 according to the present disclosure, the controller 170 may transmit at least part of data processed by the display device 100 to the wearable device through the short-range communication unit 173. Accordingly, a user of the wearable device may use the data processed by the display device 100 through the wearable device.

The display unit 180 may generate a driving signal by converting an image signal, a data signal, or an OSD signal, which is processed by the controller 170, or an image signal or a data signal, which is received by the external device interface unit 135, into R, G, and B signals.

On the other hand, the display device 100 shown in FIG. 1 is merely one embodiment of the present disclosure, and some of the illustrated elements may be integrated, added, or omitted according to the specification of the display device 100 to be actually implemented.

That is, if necessary, two or more elements may be integrated into one element, or one element may be divided into two or more elements. Additionally, the function performed by each block is provided for describing the embodiments of the present disclosure, and a specific operation or device thereof does not limit the scope of the present disclosure.

According to another embodiment of the present disclosure, the display device 100 may not include the tuner 131 and the demodulation unit 132, unlike that shown in FIG. 1, and may receive an image through the network interface unit 133 or the external device interface unit 135 and reproduce the received image.

For example, the display device 100 may be divided into an image processing device such as a set-top box for receiving a broadcast signal or content provided by various network services, and a content reproduction device for reproducing content inputted from the image processing device.

In this case, an operating method of the display device according to an embodiment of the present disclosure, which will be described below, may be performed by the display device 100 described above with reference to FIG. 1, or may be performed by any one of the image processing device such as the set-top box and the content reproduction device including the display unit 180 and the audio output unit 185.

Next, the remote control device according to an embodiment of the present disclosure will be described with reference to FIGS. 2 and 3.

Figure 2:
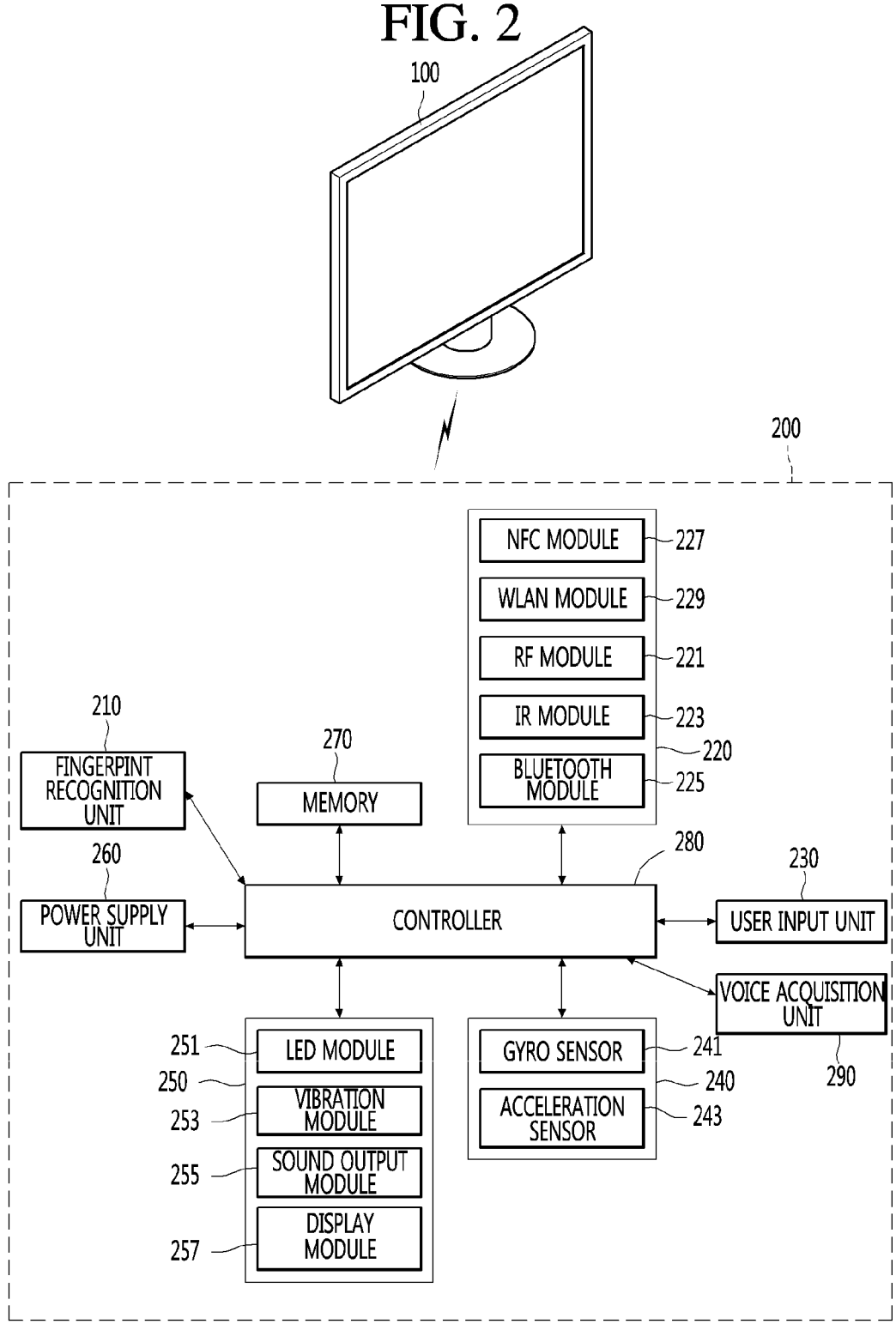
FIG. 2 is a block diagram illustrating a remote control device according to an embodiment of the present disclosure.
Figure 3:
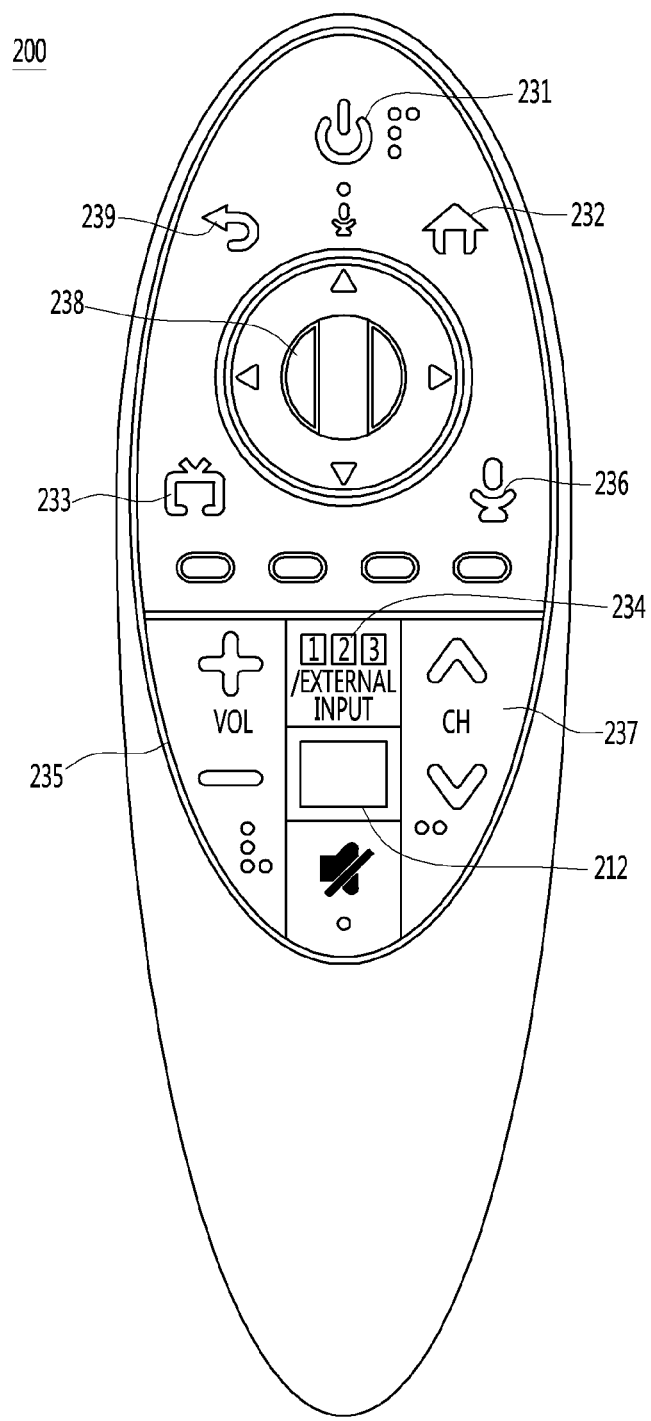
FIG. 3 is a view illustrating an actual configuration of a remote control device according to an embodiment of the present disclosure.

FIG. 2 is a block diagram of the remote control device 200 according to an embodiment of the present disclosure, and FIG. 3 illustrates an actual configuration example of the remote control device 200 according to an embodiment of the present disclosure.

First, referring to FIG. 2, the remote control device 200 may include a fingerprint recognition unit 210, a wireless communication unit 220, a user input unit 230, a sensor unit 240, an output unit 250, a power supply unit 260, a memory 270, a controller 280, and a voice acquisition unit 290.

Referring to FIG. 2, the wireless communication unit 220 transmits and receives a signal to and from any one of the display devices according to the aforementioned embodiments of the present disclosure.

The remote control device 200 may include an RF module 221 configured to transmit and receive a signal to and from the display device 100 according to an RF communication standard, and an IR module 223 configured to transmit and receive a signal to and from the display device 100 according to an IR communication standard. Additionally, the remote control device 200 may include a Bluetooth module 225 configured to transmit and receive a signal to and from the display device 100 according to a Bluetooth communication standard. Additionally, the remote control device 200 may include a Near Field Communication (NFC) module 227 configured to transmit and receive a signal to and from the display device 100 according to an NFC communication standard, and a Wireless LAN (WLAN) module 229 configured to transmit and receive a signal to and from the display device 100 according to a WLAN communication standard.

Additionally, the remote control device 200 may transmit signals containing information on a movement of the remote control device 200 to the display device 100 through the wireless communication unit 220.

On the other hand, the remote control device 200 may receive a signal transmitted by the display device 100 through the RF module 221 and, if necessary, may transmit a command for power on/off, channel change, volume change, or the like to the display device 100 through the IR module 223.

The user input unit 230 may include a keypad, a button, a touch pad, or a touch screen. The user may operate the user input unit 230 to input a command associated with the display device 100 to the remote control device 200. When the user input unit 230 includes a hard key button, the user may push the hard key button to input a command associated with the display device 100 to the remote control device 200. This will be described below with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a check button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be a button for turning on or off the power of the display device 100. The home button 232 may be a button for moving to a home screen of the display device 100. The live button 233 may be a button for displaying a broadcast program in real time. The external input button 234 may be a button for receiving an external input connected to the display device 100. The volume control button 235 may be a button for adjusting a volume outputted from the display device 100. The voice recognition button 236 may be a button for receiving a voice of a user and recognizing the received voice. The channel change button 237 may be a button for receiving a broadcast signal of a specific broadcast channel. The check button 238 may be a button for selecting a specific function, and the back button 239 may be a button for returning to a previous screen.

Again, FIG. 2 is described.

If the user input unit 230 includes a touch screen, a user can touch a soft key of the touch screen to input a command associated with the display device 100 to the remote control device 200. Additionally, the user input unit 230 may include various types of input units operated by a user, for example, a scroll key or a jog key, and this embodiment does not limit the scope of the present disclosure.

The sensor unit 240 may include a gyro sensor 241 or an acceleration sensor 243, and the gyro sensor 241 may sense information on the movement of the remote control device 200.

For example, the gyro sensor 241 may sense information on the operation of the remote control device 200 on the basis of x, y, and z axes, and the acceleration sensor 243 may sense information on a movement speed of the remote control device 200. Moreover, the remote control device 200 may further include a distance measurement sensor and sense a distance from the remote control device 200 to the display unit 180 of the display device 100.

The output unit 250 may output image or voice signals in response to operation of the user input unit 230 or image or voice signals corresponding to signals transmitted from the display device 100. A user can recognize whether the user input unit 230 is operated or the display device 100 is controlled through the output unit 250.

For example, the output unit 250 may include an LED module 251 for flashing, a vibration module 253 for generating a vibration, a sound output module 255 for outputting a sound, or a display module 257 for outputting an image, if the user input unit 230 is operated or signals are transmitted and received to and from the display device 100 through the wireless communication unit 220.

Additionally, the power supply unit 260 supplies power to the remote control device 200 and, if the remote control device 200 does not move during a predetermined period of time, stops supplying power, so that power waste can be reduced. The power supply unit 260 may resume the supply of power if a predetermined key provided in the remote control device 200 is operated.

The memory 270 may store various types of programs and application data necessary for the control or operation of the remote control device 200. If the remote control device 200 transmits and receives signals wirelessly through the display device 100 and the RF module 221, the remote control device 200 and the display device 100 transmit and receive signals through a predetermined frequency band.

The controller 280 of the remote control device 200 may store, in the memory 270, information on a frequency band for transmitting and receiving signals wirelessly to and from the display device 100 paired with the remote control device 200 and refer to the information.

The controller 280 controls the overall operation of the remote control device 200. The controller 280 may transmit a signal corresponding to a predetermined key operation of the user input unit 230 or a signal corresponding to a movement of the remote control device 200 sensed by the sensor unit 240 to the display device 100 through the wireless communication unit 220.

Additionally, the voice acquisition unit 290 of the remote control device 200 may obtain a voice.

The voice acquisition unit 290 may include at least one microphone 291 and acquire a voice through the microphone 291.

Figure 4:
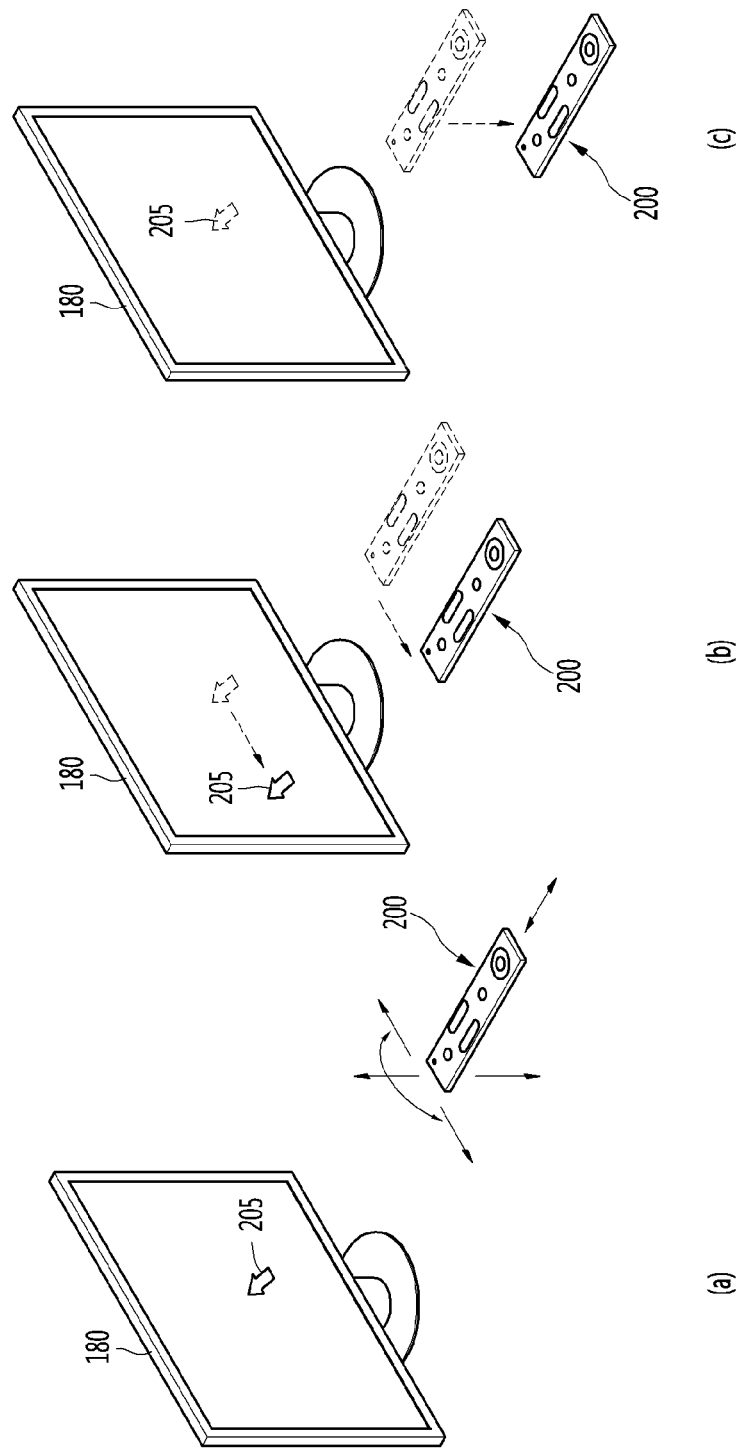
FIG. 4 is a view of utilizing a remote control device according to an embodiment of the present disclosure.

Next, FIG. 4 is described.

FIG. 4 illustrates an example of utilizing the remote control device according to an embodiment of the present disclosure.

FIG. 4A illustrates an example in which a pointer 205 corresponding to the remote control device 200 is displayed on the display unit 180.

A user can move or rotate the remote control device 200 vertically or horizontally. The pointer 205 displayed on the display unit 180 of the display device 100 corresponds to the movement of the remote control device 200. Since the pointer 205 is moved and displayed according to a movement on a 3D space as shown in the drawing, the remote control device 200 may also be referred to as a spatial remote control device.

FIG. 4B illustrates an example in which if a user moves the remote control device 200 to the left, the pointer 205 displayed on the display unit 180 of the display device 100 is also moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 at a position corresponding to the calculated coordinates.

FIG. 4C illustrates an example in which while a specific button in the remote control device 200 is pressed, a user moves the remote control device 200 away from the display unit 180. Due to this, a selection area in the display unit 180 corresponding to the pointer 205 may be zoomed in and displayed larger.

On the contrary, if a user moves the remote control device 200 in a direction closer to the display unit 180, a selection area in the display unit 180 corresponding to the pointer 205 may be zoomed out and displayed in a reduced size.

On the other hand, if the remote control device 200 is moved away from the display unit 180, a selection area may be zoomed out, and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement may not be recognized and only the back and forth movement may be recognized. While a specific button in the remote control device 200 is not pressed, only the pointer 205 is moved according to the up, down, left, or right movement of the remote control device 200.

The moving speed or moving direction of the pointer 205 may correspond to the moving speed or moving direction of the remote control device 200.

On the other hand, the pointer 205 in this specification means an object displayed on the display unit 180 in response to the operation of the remote control device 200. Accordingly, besides an arrow form displayed as the pointer 205 in the drawing, various forms of objects are possible. For example, the above concept includes a point, a cursor, a prompt, and a thick outline. The pointer 205 may be displayed corresponding to one point of a horizontal axis and a vertical axis on the display unit 180 and can also be displayed corresponding to a plurality of points such as a line and a surface.

Next, a driving principle of an OLED will be described with reference to FIG. 5.

Figure 5:
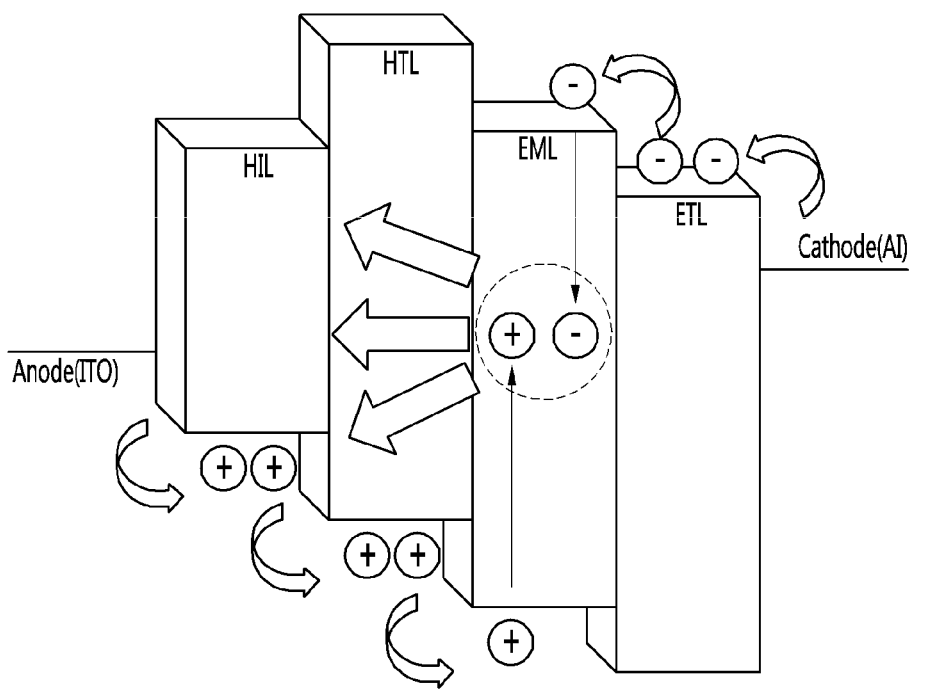
FIG. 5 is a view for describing a driving principle of an OLED included in an OLED display device according to the present disclosure.

FIG. 5 is a view for describing a driving principle of an OLED included in an OLED display device according to the present disclosure.

An OLED has a structure in which a transparent indium tin oxide (ITO) anode layer is formed on a transparent substrate such as glass, and a multi-layered thin film of organic materials having different transport capabilities and a cathode of an Mg—Ag alloy are sequentially formed on the anode layer.

The anode layer includes an anode and a cathode, and the anode layer includes a transparent electrode, such as ITO, so that light generated in an emitting layer is transmitted toward the outside. Since the OLED is a charge injection type light emitting device, charge injection efficiency between interfaces is a factor that has the greatest influence on the performance of the device.

The emitting layer (EML) is a layer in which holes (+) passing through the anode and electrons (−) passing through the cathode recombine to generate light.

Specifically, in the OLED, as a voltage is applied between two electrodes, holes and electrons are injected from the anode and the cathode, respectively, and when the holes and the electrons reach the emitting layer, the holes and the electrons recombine in the emitting layer to form excitons of an excited state. Light is obtained by emission recombination of the excitons and becomes a ground state. At this time, an emission wavelength is determined by energy of exciton, that is, an energy difference between HOMO and LUMO, and the generated light is emitted toward the transparent electrode (anode). The light generated in the emitting layer emits red, blue, and green colors, and a spectrum thereof is determined according to bond energy in the emitting layer. Therefore, an emission color is determined according to a material for forming the emitting layer.

Additionally, the OLED further includes a hole injection layer (HIL), a hole transfer layer (HTL), and an electron transfer layer (ETL), which enable the holes and the electrons to be easily moved to the emitting layer.

The hole transfer layer uses an electron donating molecule having small ionization potential so as to facilitate hole injection from the anode. Diamine, triamine, or tetramine derivatives having triphenylamine as a basic are mainly used.

The electron transfer layer is a layer that smoothly transfers electrons supplied from the cathode to the emitting layer and suppresses the movement of holes not bonded in the emitting layer, thereby increasing recombination probability in the emitting layer. The electron transfer layer is required to have excellent electron affinity and adhesion to the cathode electrode.

Next, the operation of a pixel circuit, to which the OLED is connected, will be described with reference to FIG. 6.

Figure 6:
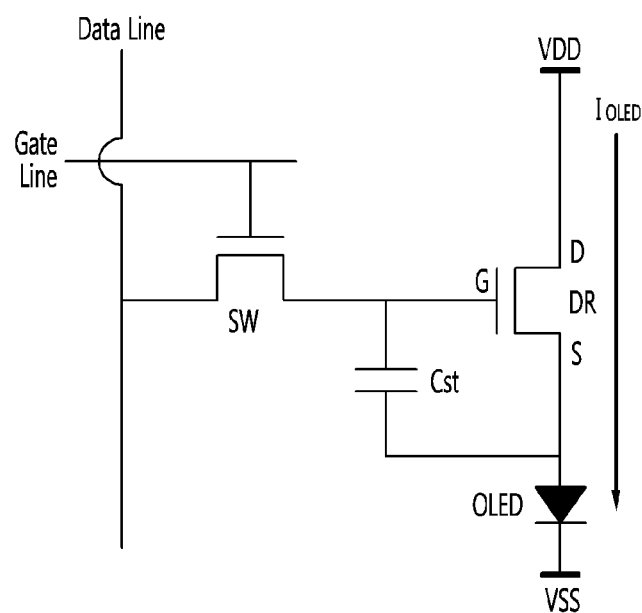
FIG. 6 is an equivalent circuit diagram of a pixel to which the OLED of FIG. 5 is connected, according to an embodiment of the present disclosure.

FIG. 6 is an equivalent circuit diagram of a pixel to which the OLED of FIG. 5 is connected, according to an embodiment.

The pixel of the OLED display device generally includes two transistors and one capacitor (2T1C). Specifically, referring to FIG. 6, the pixel of the OLED display device includes a data line and a gate line intersecting with each other, a switch TFT SW, a drive TFT DR, and a storage capacitor Cst.

The switch TFT SW is turned on in response to a scan pulse from the gate line so that a current path is formed between a source electrode and a drain electrode thereof. During on-time duration of the switch TFT SW, a data voltage from the data line is applied to a gate electrode of the drive TFT DR and one electrode of the storage capacitor Cst through the source electrode and the drain electrode of the switch TFT SW.

The storage capacitor Cst stores a difference voltage between the data voltage and a high-potential driving voltage VDD and constantly maintains the difference voltage during one frame period, and the drive TFT DR controls a current IDLED flowing through the OLED according to the data voltage applied to the gate electrode thereof.

The source-drain voltage of the TFT is determined by the driving voltage VDD applied to the OLED.

Figure 7:
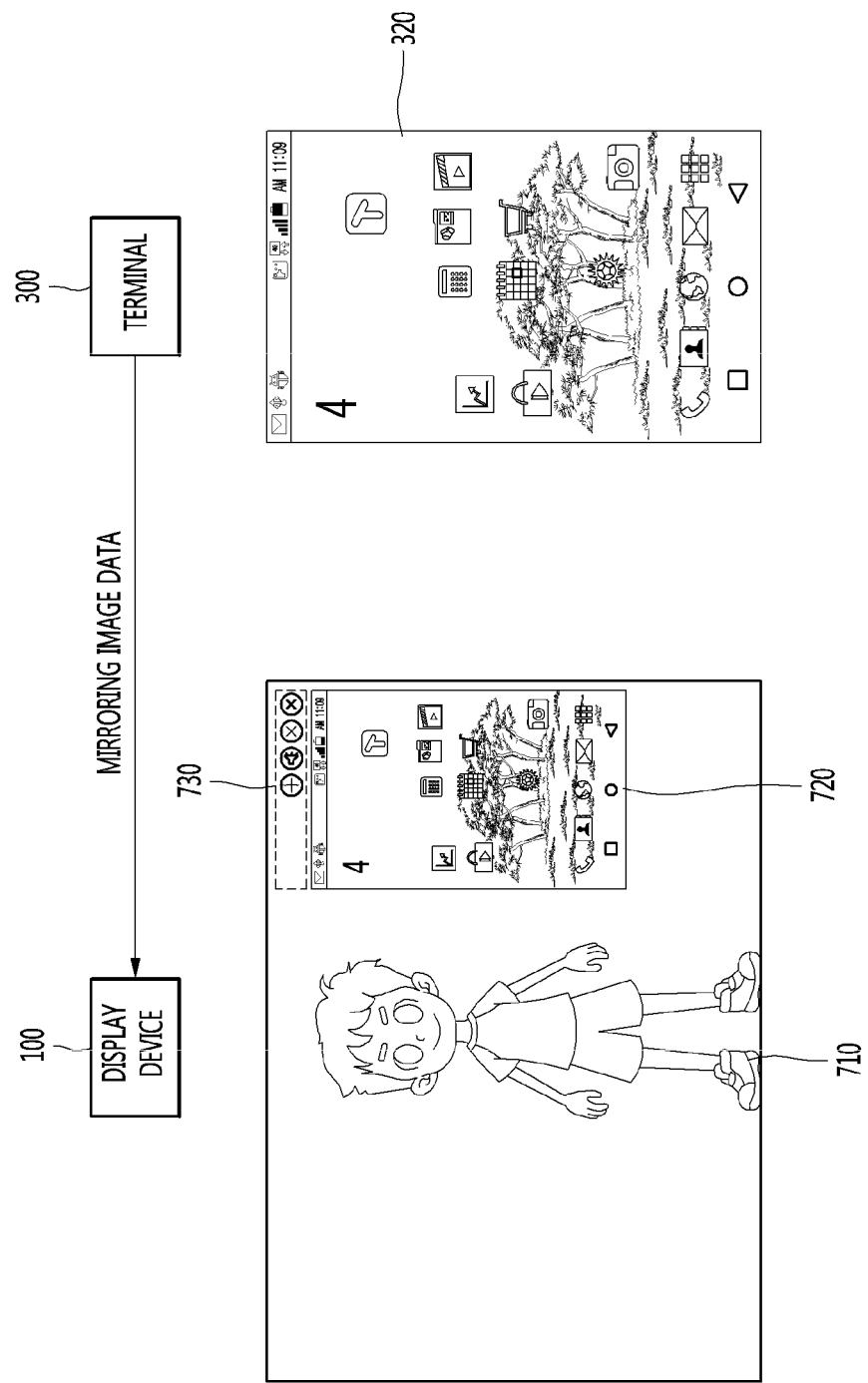
FIG. 7 is a view illustrating a screen mirroring function performed between the OLED display device and the terminal.

FIG. 7 is a view illustrating a screen mirroring function between the OLED display device and the terminal.

Referring to FIG. 7, an OLED display device 100 (hereinafter, referred to as "display device") may be connected with a terminal 300. For example, the display device 100 may be connected with the terminal 300 through a communication unit which supports various well-known wireless communication manners, such as Wi-Fi, Wi-Fi Direct, WLAN, or the like, or wired communication manners. The communication unit may refer to the network interface unit 133 or the external device interface unit 135 illustrated in FIG. 1 or may include an additional communication module.

The terminal 300 may include various mobile terminals such as a smartphone, a tablet PC, a wearable device, or the like.

For example, the user may be connected with the display device 100 and the terminal 300 for executing the screen mirroring function. When the screen mirroring function is executed, the terminal 300 may transmit mirroring image data, which corresponds to a screen 320 displayed on the display unit of the terminal 300, to the display device 100.

The display device 100 may display a mirroring image 720 on a display unit 180, based on the mirroring image data received from the terminal 300. The mirroring image 720 may correspond to the screen 320 displayed on the display unit of the terminal 300. According to an embodiment, the display device 100 may display a menu 730, which is related with the screen mirroring function, adjacent to one side (top side) of the mirroring image 720.

As illustrated in FIG. 7, the display device 100 may be in a state of displaying the broadcast image 710 received from the broadcast reception unit 130 when executing the screen mirroring function. In this case, the display device 100 may display the broadcast image 710 and the mirroring image 720 on the display unit 180. For example, the display device 100 may display the broadcast image 710 and the mirroring image 720 on the display unit 180 by overlaying the mirroring image 720 with a partial region of the broadcast image 710, or by partitioning the broadcast image 710 and the mirroring image 720 into each other.

In general, the display device 100 may display the mirroring image 720 on a predetermined region of the display unit 180 without changing a region in which the mirroring image 720 is displayed. The mirroring image 720 may have a higher frequency in including a still image, as compared with the broadcast image 710. In this case, since the OLED element corresponding to the higher brightness region of the mirroring image 720 continuously emits higher-brightness light, the OLED element may have a lifespan reduced more rapidly than an OLED element provided in another region. When the lifespan of the element corresponding to the higher brightness region is reduced, the brightness of light emitted from the element may be relatively reduced.

Accordingly, the afterimage phenomenon is generated on a screen of the display device 100 due to the brighten difference from the element in another region and thus a user may feel inconvenient in viewing an image through the display device 100, thereby serving as a main cause of degrading the reliability of a product In order to solve the above problems, according to various embodiments of the present disclosure, the OLED display device will be described with reference to FIGS. 8 to 21.

Figure 8:
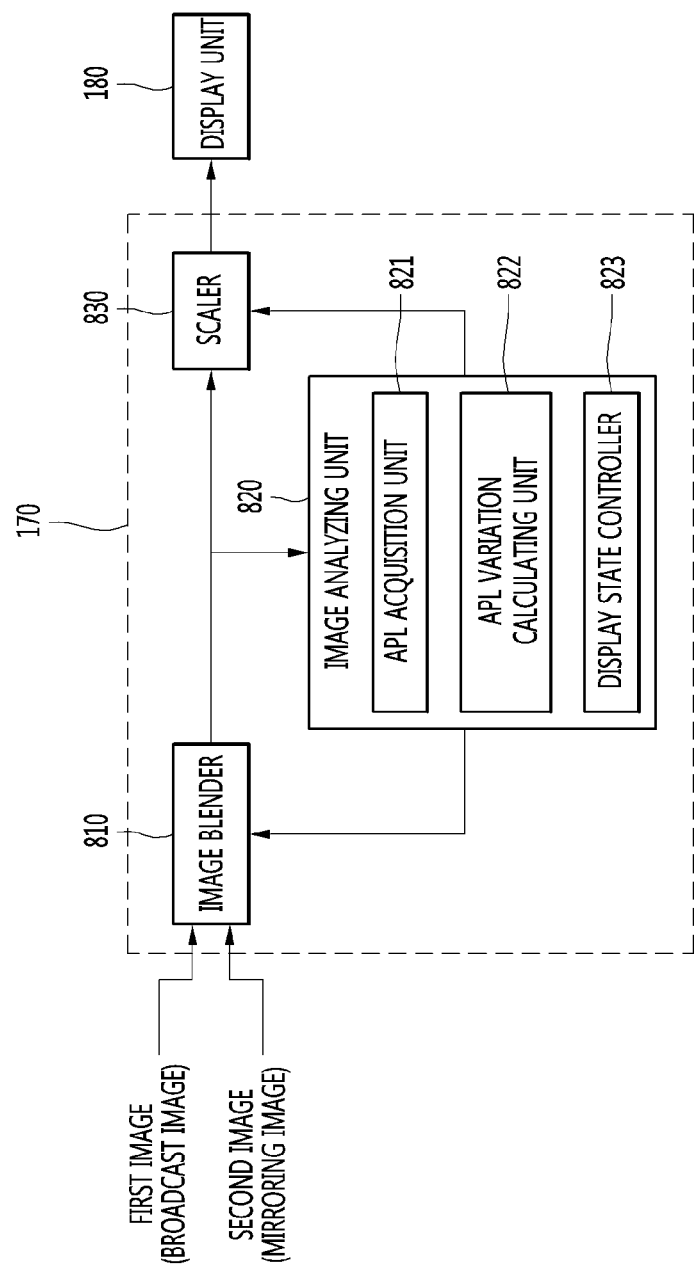
FIG. 8 is a block diagram schematically illustrating elements for operations of the OLED display device according to an embodiment of the present disclosure.

FIG. 8 is a block diagram schematically illustrating elements for the operation of the OLED display device according to an embodiment of the present disclosure.

Referring to FIG. 8, the display device 100 may include an image blender 810, an image analyzing unit 870, and a scaler 830 as elements processing images received from a plurality of sources such that the images are simultaneously displayed on the display unit 180.

Although the image blender 810, the image analyzing unit 870, and the scaler 830 may be some elements included in the controller 170 of the display device 100, the image blender 810, the image analyzing unit 870, and the scaler 830 may be implemented separately from the controller 170 according to embodiments.

Although FIG. 8 illustrates a first image (broadcast image) and a second image (mirroring image) by way of images received from the sources, the first image may correspond to various images provided from the network interface 133, the external device interface unit 135, or the storage unit 140 instead of the broadcast image.

The image blender 810 may create one blending image by blending the first image with the second image. In detail, the image blender 810 may arrange the frame of the first image and the frame of the second image in one blending frame. For example, the image blender 810 may arrange the frame of the first image in the whole region of the blending frame and arrange the frame of the second image in a partial region of the frame of the first region by overlaying the frame of the second image with the partial region of the frame of the first image. For example, the image blender 810 may arrange the frame of the first image in a partial region of the blending frame and arrange the frame of the second image in a remaining region of the blending frame which is not overlapped with the frame of the first image.

The scaler 830 may scale the first image and the second image to have resolutions allowing the output through the display unit 251 and may transmit the first image and the second image to the display unit 180. The scaler 830 may include a main scaler which scales the first image and a sub-scaler which scales the second image.

The image analyzing unit 820 may control the state of the second image based on an average picture level (APL) of the second image of the blending image output from the image blender 810. To this end, the image analyzing unit 820 may include an APL acquisition unit 821, an APL variation calculating unit 822, and a display state control unit 823.

The APL acquisition unit 821 may acquire the APL of the second image of the blending image. When the first image is blended with the second image by the image blender 810, the region in which the second image is displayed may be preset. Accordingly, the APL acquisition unit 821 may acquire the APL of the second image by acquiring the APL for the region in which the second image of the blending image is displayed. Meanwhile, the APL may refer to an average brightness value for the specific region.

Regarding the frame of the second image, the APL acquisition unit 821 may periodically acquire the APL of the second image. In other words, the APL acquisition unit 821 may acquire the APL with respect to each of the frames of the second image or may acquire the APL at a predetermined frame interval. According to the embodiment, the acquired APL may be stored in the storage unit 140.

The APL variation calculating unit 822 may calculate an APL variation by comparing the APL, which is acquired by the APL acquisition unit 821, with a previously acquired APL.

The display state control unit 823 may detect, based on the APL variation, whether frames of the second image are identical to each other and may determine whether the terminal transmitting the second image operates depending on the detecting result. The operation of the terminal 300 may refer to that the screen displayed on the display unit of the terminal 300 by the manipulation of the user is changed as time elapses. That the terminal 300 does not operate may refer to that the same screen is displayed on the display unit of the terminal 300 as the user does not manipulate the terminal 300. In other words, that the same screen is displayed on the display unit as the user does not manipulate the terminal 300 may refer to that the user does not view the screen of the terminal 300 and the second image displayed on the display device 100.

The display state control unit 823 may detect that the frames of the second image are identical to each other when the APL variation is less than a reference variation (or equal to or less than the reference variation). When each of APL variations continuously calculated during a predetermined time or a predetermined count is less than the reference variation (or equal to or less than the reference variation), the display state control unit 823 may determine that the terminal 300 does not operate. Accordingly, the display state control unit 823 may determine the operation state of the terminal 300 only when the acquired APL is higher than the reference APL. This is because, when the brightness of the second image is lower than predetermined brightness, the difference in a lifespan reduction degree between the OLED elements may not be greatly represented between the region in which the second image is displayed and a remaining region.

The display state control unit 823 may control the image blender 810 or the scaler 830 such that the display state of the second image is changed, when each of the APL variations continuously calculated during the predetermined time or a predetermined count is less than the reference variation (or equal to or less than the reference variation).

For example, the display state control unit 823 may control the image blender 810 or the scaler 830 such that the second image is not displayed on the display unit 180. According to an embodiment, the display state control unit 823 may control the image blender 810 or the scaler 830 by adjusting the transparency of the second image or adjusting the size of the second image as a time or a count to maintain that the APL variation is less than the reference variation. In this connection, the image blender 810 may include an alpha blender for adjusting the transparency of the second image. The alpha blender may synthesize the second image with the first image by employing the transparency of the second image. Accordingly, the overlap between the first image and the second image may be displayed on the region in which the second image is displayed. For example, as the transparency is increased, the second image may be more transparent and the first image may more become sharpened.

Meanwhile, the display state control unit 823 may control the image blender 810 and the scaler 830 such that the display of the second image is maintained when the calculated APL variation is equal to or greater than the reference variation (or excesses the reference variation). Accordingly, the second image may be continuously displayed in the preset region.

Hereinafter, the operations of the OLED display device according to various embodiments of the present disclosure will be described with reference to FIGS. 9 to 21.

Figure 9:
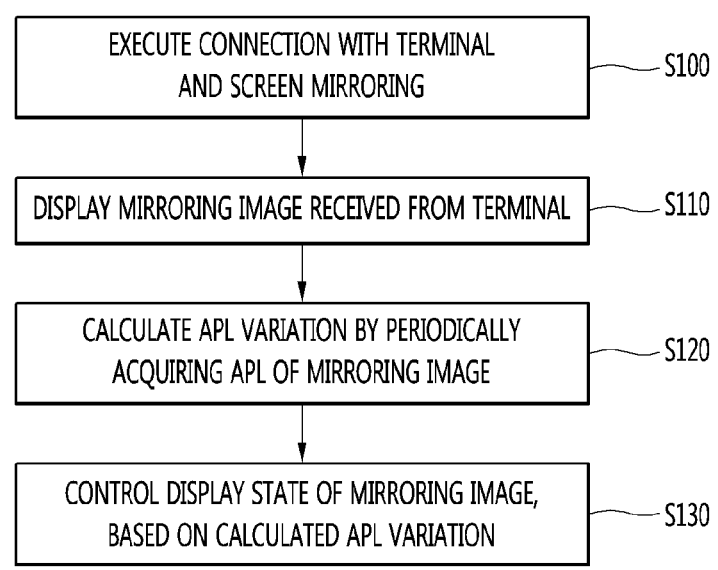
FIG. 9 is a flowchart illustrating the operation of controlling the display state of the mirroring image by the OLED display device according to an embodiment of the present disclosure.

FIG. 9 is a flowchart illustrating the operation of controlling the display state of the mirroring image by the OLED display device according to an embodiment of the present disclosure.

Referring to FIG. 9, the display device 100 may be connected with the terminal 300 to execute a screen mirroring function (S100).

For example, the user may connect the display device 100 with the terminal 300 through a predetermined communication manner and may execute the screen mirroring function to display the image corresponding to the screen of the terminal 300 on the display unit 180.

The display device 100 may display a mirroring image on the display unit 180 based on the mirroring image data received from the terminal 300 as the screen mirroring function is executed (S110).

As described above, the controller 170 may display the mirroring image, which is based on mirroring image data received from the terminal 300, on a predetermined region of the display unit 180. According to an embodiment, when the display device 100 displays another image of a broadcast image, the controller 170 may display the mirroring image by overlaying the mirroring image with a specific region of the another image or by partitioning the another image and the mirroring image into each other.

The display device 100 may calculate the APL variation by periodically acquiring the APL of the mirroring image (S120).

In detail, the controller 170 may acquire the APL of the mirroring image from the received mirroring image data with respect to each frame or at a predetermined frame interval and may calculate the APL variation by comparing the acquired APL with the previously-acquired APL. According to the embodiment, the controller 170 may aperiodically acquire the APL of the mirroring image.

The display device 100 may control the display state of the mirroring image based on the calculated APL variation (S130).

Steps S120 and S130 will be described in more detail with reference to FIG. 10.

Figure 10:
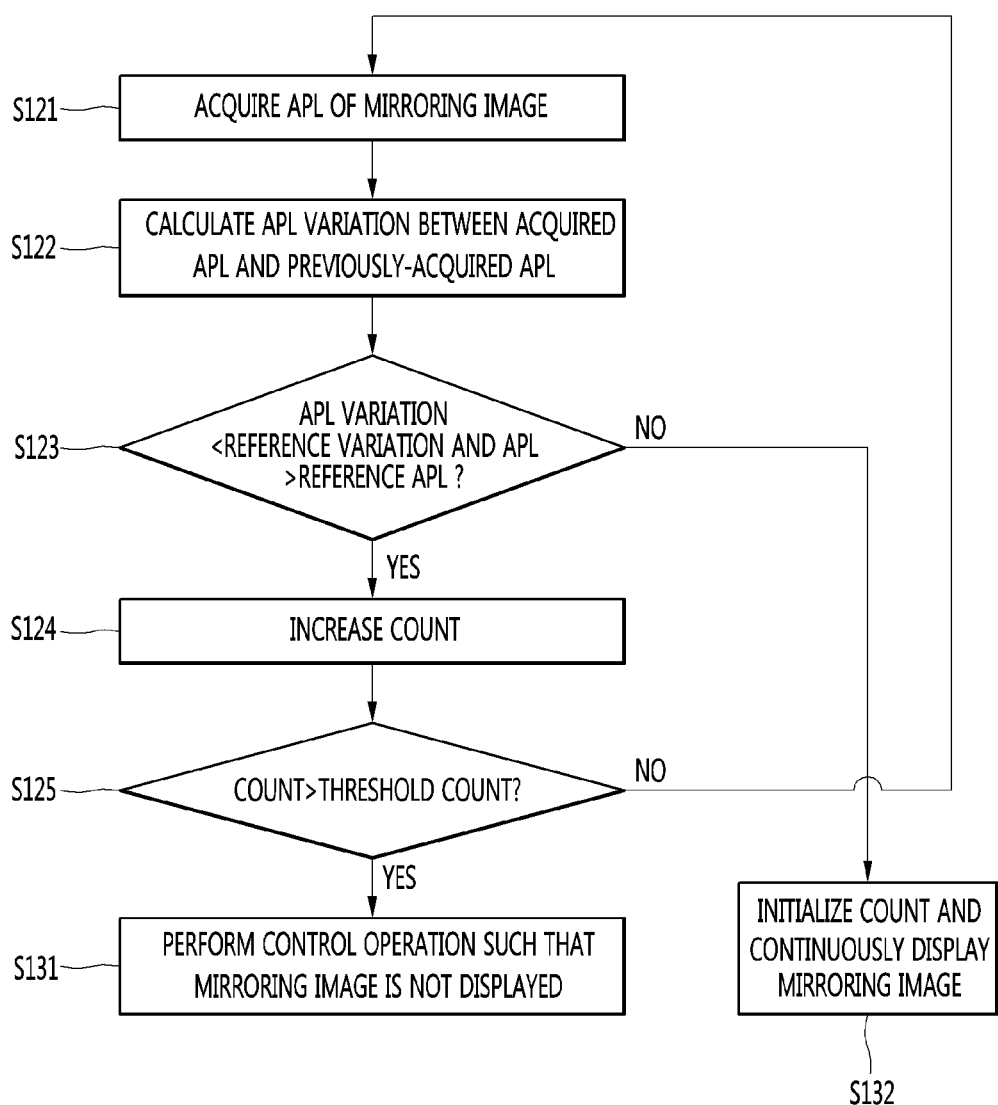
FIG. 10 is a flowchart illustrating the operation of the OLED display device illustrated in FIG. 9 in more detail.

FIG. 10 is a flowchart illustrating an operation of the OLED display device illustrated in FIG. 9 in more detail.

Referring to FIG. 10, the display device 100 may acquire the APL of the mirroring image (S121).

For example, the controller 170 may acquire the APL for a present frame from the mirroring image data received from the terminal 300.

The display device 100 may calculate the APL variation between the acquired APL and a previously acquired APL (S122).

The controller 170 may calculate the APL variation by comparing the acquired APL for the present frame with an APL acquired for a previous frame or frames before the predetermined number of frames.

The display device 100 may determine the mirroring image as being identical and may increase a count when the calculated APL variation is less than the reference variation (or equal to or less than the reference variation (see Yes of S123)).

Meanwhile, the display device 100 may increase a count when the APL variation is less than the reference variation and when the APL acquired in S121 is higher than the reference APL (or equal to or higher than the reference APL). In addition, according to the embodiment, when the APL acquired in step S121 is lower than the reference APL (or equal to or lower than the reference APL), steps S122 and S123 may not be performed and the display state of the mirroring image may be maintained.

According to an embodiment, the count may refer to a time measured by a timer (not illustrated) of the display device 100. In this case, the threshold count may refer to a preset threshold time.

When the count exceeds the preset threshold count (or arrives to the threshold count) (see Yes of S125), the display device 100 may perform a control operation such that the mirroring image is not displayed (referred to as "non-display state") (S131). Meanwhile, when the count is lower than the preset threshold count, steps S121 to S123 may be performed with respect to a next frame of the mirroring image or frames after the predetermined number of frames.

The threshold count may correspond to the reference allowing the display device 100 to determine the operation state of the terminal 300 as described with reference to FIG. 8. The display device 100 may determine that the terminal 300 is not operated when the count exceeds the threshold count.

Meanwhile, in step S123, when the APL variation is equal to or greater than (or exceeds) the reference variation, the display device 100 may initialize the count and may continuously display the mirroring image. In other words, when the APL variation is equal to or greater than the reference variation, the controller 170 may determine that the terminal 300 operates and may display the mirroring image on the display unit 180.

Meanwhile, in this connection with step S131, the display device 100 may change the display state of the mirroring image according to the increase of the count or the time for maintaining the state that the APL variation is less than the reference variation and may change the state of the mirroring image to the non-display state when the count or the time exceeds the threshold count or the threshold time, respectively. Various embodiments related to this will be described with reference to FIGS. 11 to 15.

FIGS. 11 to 15 are views illustrating various embodiments related to the operation that the OLED display device may change the state of the mirroring image to the non-display state, based on embodiments illustrated in FIGS. 9 and 10.

Figure 11:
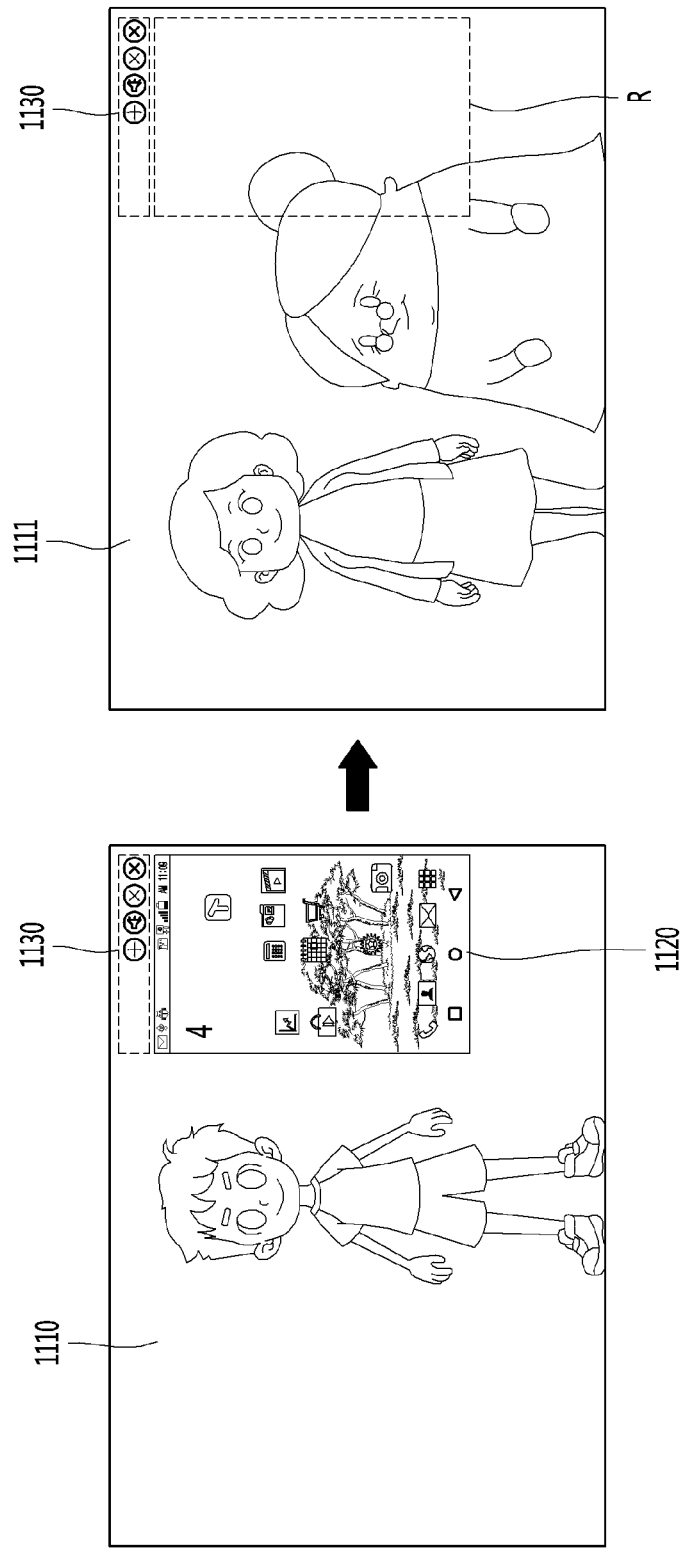
FIGS. 11 to 15 are views illustrating various embodiments related to the operation that the OLED display device changes the state of the mirroring image to the non-display state, based on the embodiments illustrated in FIGS. 9 and 10.
Figure 12:
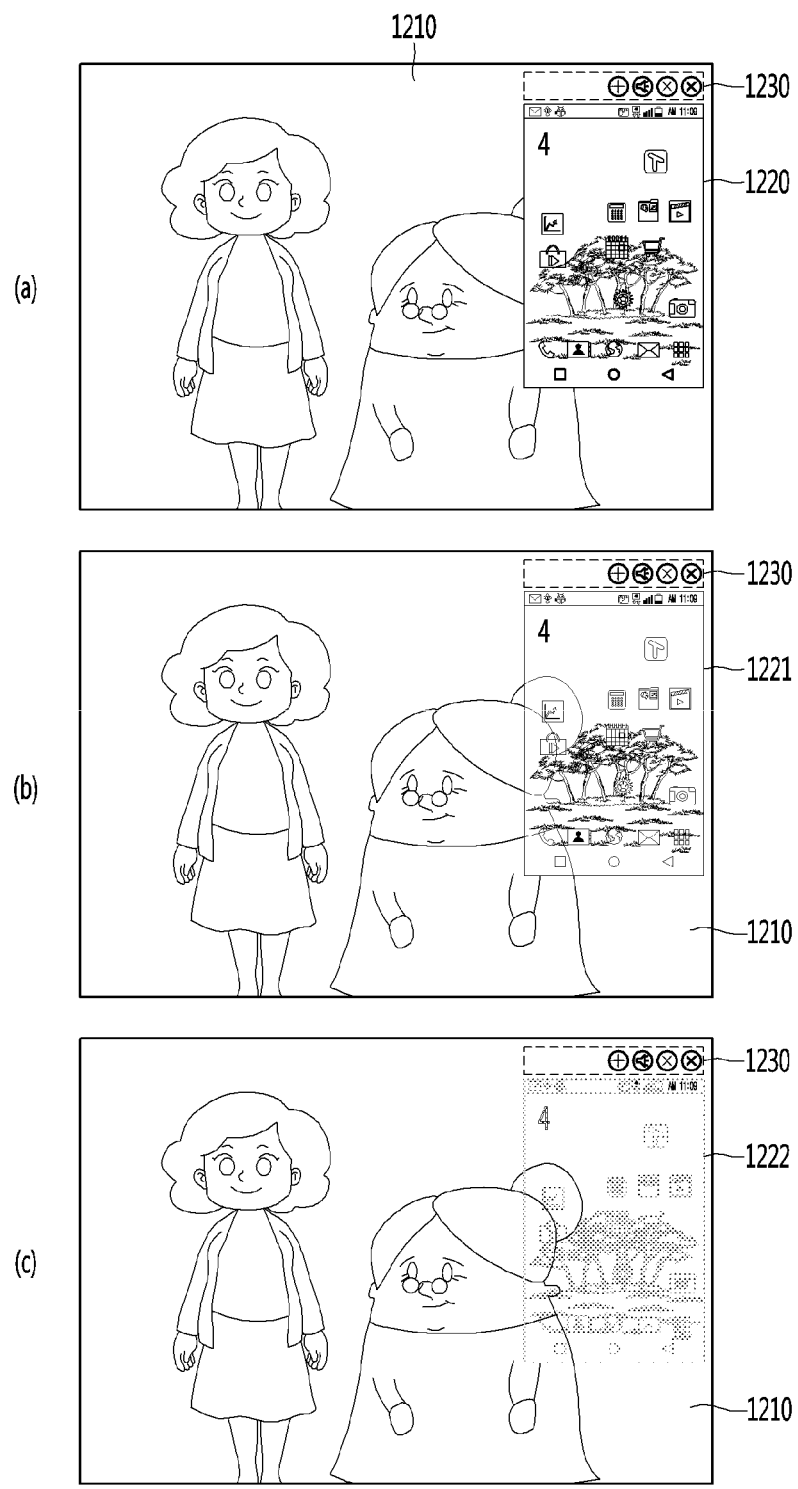

Referring to FIG. 11, the controller 170 may display a first image 1110 and a second image 1120 on the display unit 180. It is assumed that the first image 1110 is a broadcast image 1110 received from the broadcast reception unit 130. The second image 1120 may be the mirroring image 1120 received from the terminal 300 as the screen mirroring function is executed.

The controller 170 may display the broadcast image 110 on the full region of the display unit 180 and may display the mirroring image 1120 by overlaying the mirroring image 1120 with a partial region of the broadcast image 1120.

According to an embodiment, the controller 170 may further display a mirroring menu 1130 including a menu or an icon related to the screen mirroring function. The mirroring menu 1130 may be displayed adjacent to one side (for example, an upper side) of the mirroring image 1120.

As described above with reference to FIGS. 9 and 10, the controller 170 may periodically calculate an APL for the mirroring image 1120 and may change the state of the mirroring image 1120 to the non-display state when the APL variation of the mirroring image 1120 is maintained to be less than the reference variation during the threshold time or the threshold count. Accordingly, the broadcast image 1110 may be displayed on a region R in which the mirroring image 1120 is displayed. Even if the state of the mirroring image 1120 is changed to the non-display state, since the screen mirroring function is not terminated, the mirroring menu 1130 may be continuously displayed.

As the state of the mirroring image 1120 is changed to the non-display state, a portion of the broadcast image 1110 may be displayed on the region R in which the mirroring image 1120 is displayed. In other words, the OLED element positioned in the region R displays the broadcast image 1110 having the varying APL without continuously emitting the same light as the APL of the mirroring image 1120 is not changed for a long time, the OLED element may represent a lifespan reduction degree approximate to that of OLED element existing in another region other than the region R. Accordingly, the afterimage phenomenon occurring in the display unit 180 due to the lifespan difference may be prevented.

Meanwhile, referring to FIGS. 12A to 12C, the controller 170 may adjust the transparency of the mirroring image 1220, based on the time or the count for maintaining that the APL variation is less than the reference variation.

For example, when the time that the APL variation is less than the reference variation is a first time, the controller 170 may display the mirroring image 1221 having the transparency adjusted to the first transparency as illustrated in FIG. 12B. In addition, when the time that the APL variation is less than the reference variation is increased to a second time (that is, the second time is greater than the first time), the controller 170 may display the mirroring image 1222 having the transparency adjusted to the second transparency greater than the first transparency as illustrated in FIG. 12C. As the transparency is increased, the mirroring images 1220 to 1222 are transparent and the broadcast image 1210 in the region overlapped with the mirroring images 1220 to 1222 may be cleared.

Finally, when the time that the APL variation is less than the reference variation arrives at the threshold time, the controller 170 may does not display the mirroring image as illustrated in FIG. 11.

Figure 13:
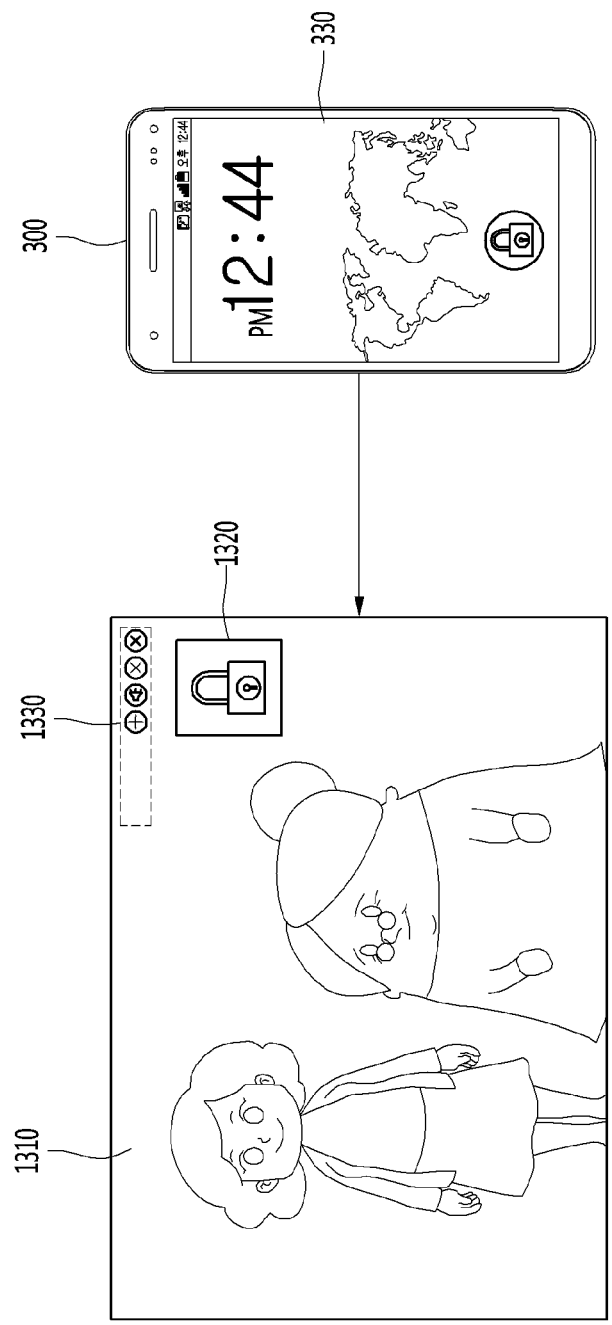

Referring to FIG. 13, according to an embodiment, the terminal 300 may be locked when the user does not manipulate the terminal 300 for a predetermined time. In this case, the locking screen may be displayed on the display unit of the terminal 300. When the predetermined time is shorter than the above-described threshold time, before the controller 170 changes the display state of the mirroring image to the non-display state, the screen of the terminal 300 may be changed to the locking screen.

In this case, the controller 170 may display the locking icon 1320, which represents the locking state of the terminal 300, on the display unit 180 instead of displaying the mirroring image corresponding to the locking screen of the terminal 300. The terminal 300 may transmit a signal for representing the change to the locking state to the display device 100 in the change to the locking state. The controller 170 may sense that the terminal 300 is switched to the locking state by receiving the signal from the terminal 300. The controller 170 may display the locking icon 1320 on the display unit 180 together with the broadcast image 1310, instead of the mirroring image transmitted from the terminal 300, based on the sensing result. According to an embodiment, the display position of the locking icon 1320 may be periodically or aperiodically changed. For example, the locking icon 1320 may be displayed while moving along the edge region of the display unit 180, but the present disclosure is not limited thereto.

Figure 14:
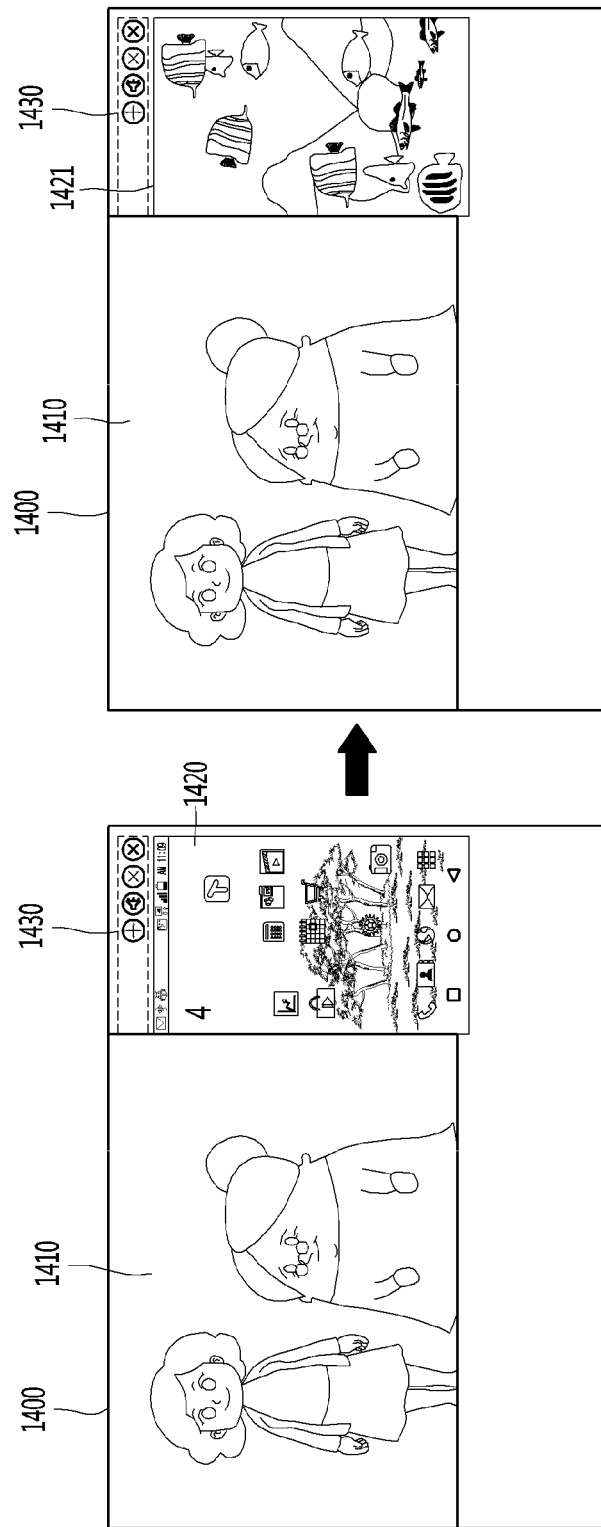
Figure 15:
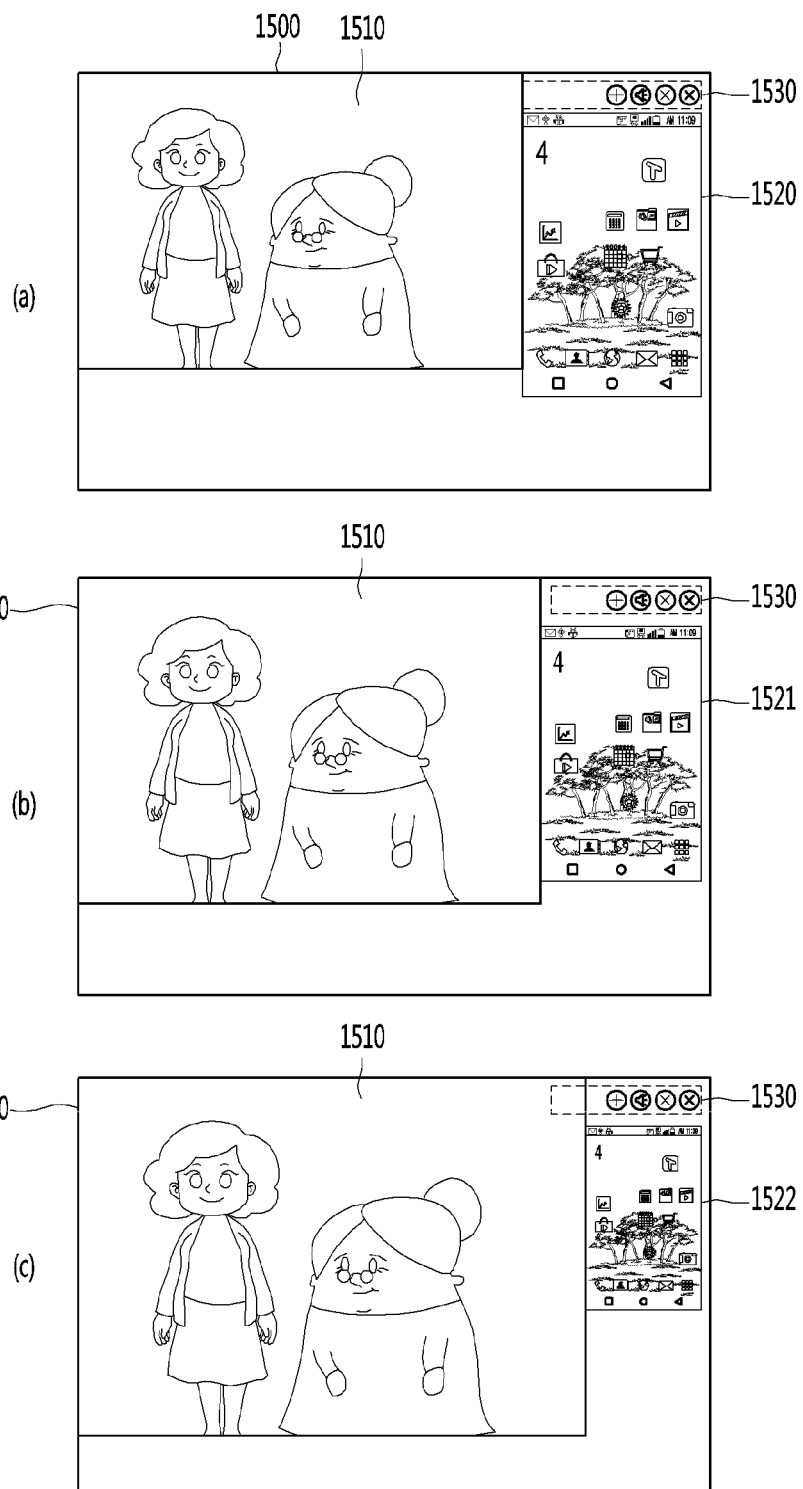

Referring to FIGS. 14 and 15, the controller 170 may display the broadcast image 1410 and the mirroring image 1420 on the full region of the display unit 180 by partitioning the broadcast image 1410 and the mirroring image 1420 into each other. For example, the broadcast image 1410 may be displayed on the first region of the display unit 180 and the mirroring image 1420 may be displayed on the second region of the display unit 180. The second region may correspond to the region that does not overlap with the first region. In this case, as illustrated in drawings, the image may be not displayed on a partial region of the display unit 180 due to the ratio between the broadcast image 1410 and the mirroring image 1420. As the broadcast image 1410 and the mirroring image 1420 are partitioned into each other and displayed, the size of the broadcast image 1410 may be reduced as compared with the size of the broadcast image 1110 illustrated in FIG. 11.

The controller 170 may change the state of the mirroring image 1420 to the non-display state as illustrated in FIG. 14 and may display a screen protection image 1421 on the region that the mirroring image 1420 is displayed when a time or a count for maintaining the display state that the APL variation of the mirroring image 1420 is less than the reference variation arrives at a threshold time or a threshold count. The screen protection image 1421 may correspond to a moving picture instead of a still image.

Referring to FIGS. 15A to 15C, the controller 170 may adjust the size of the mirroring image 1520 according to the increase of the time or the count for maintaining the display state that the APL variation of the mirroring image 1520 is less than the reference variation.

For example, the controller 170 may display the mirroring image 1521 having a size adjusted to the first size as illustrated in FIG. 15B, when a time for maintaining the state that the APL variation is less than the reference variation is the first time. In addition, the controller 170 may display the mirroring image 1522 having the size adjusted to the second size less than the first size as illustrated in FIG. 15C when the time that the APL variation is less than the reference variation is increased to the second time (in other words, the second time is greater than the first time). As the sizes of the mirroring images 1520 to 1522 are reduced, the size of the broadcast image 1510 may be increased.

Finally, when the time for maintaining that the APL variation is less than the reference variation arrives at the threshold time, the controller 170 may not display the mirroring image and may display the broadcast image 1510 on the full region 1500 of the display unit 180.

In other words, according to an embodiment of the present disclosure, the display device 100 may change the state of the mirroring image to the non-display state when the APL of the mirroring image is not changed for a predetermined time. Accordingly, since the OLED elements positioned in the region, in which the mirroring image is displayed, may display the broadcast image having the varied APL instead of continuously emitting the same as the APL of the mirroring image is not changed for a long time, the OLED elements may have a lifespan reduction degree approximate to that of the OLED elements present in another region. Accordingly, the afterimage phenomenon occurring on the display unit 180 due to the lifespan difference between OLED elements may be prevented.

Figure 16:
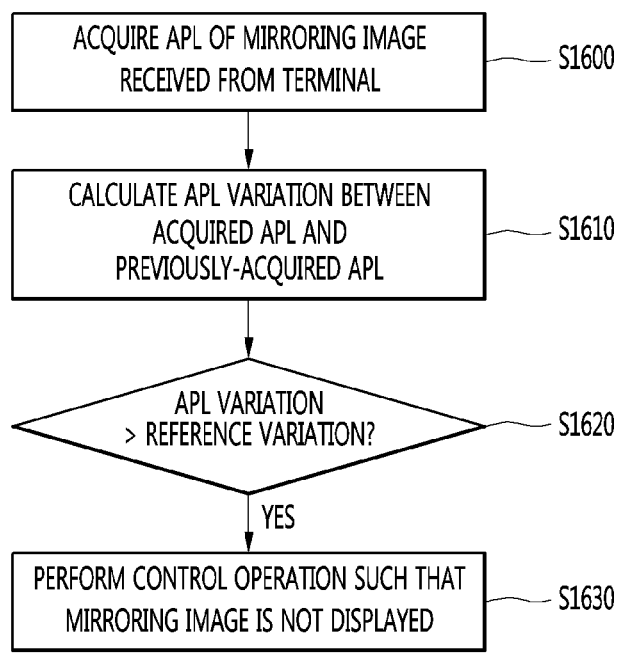
FIGS. 16 and 17 are flowcharts illustrating embodiments of an operation that the OLED display device changes the non-display state of the mirroring image according to the embodiments of FIGS. 10 to 15 to the display state.
Figure 17:
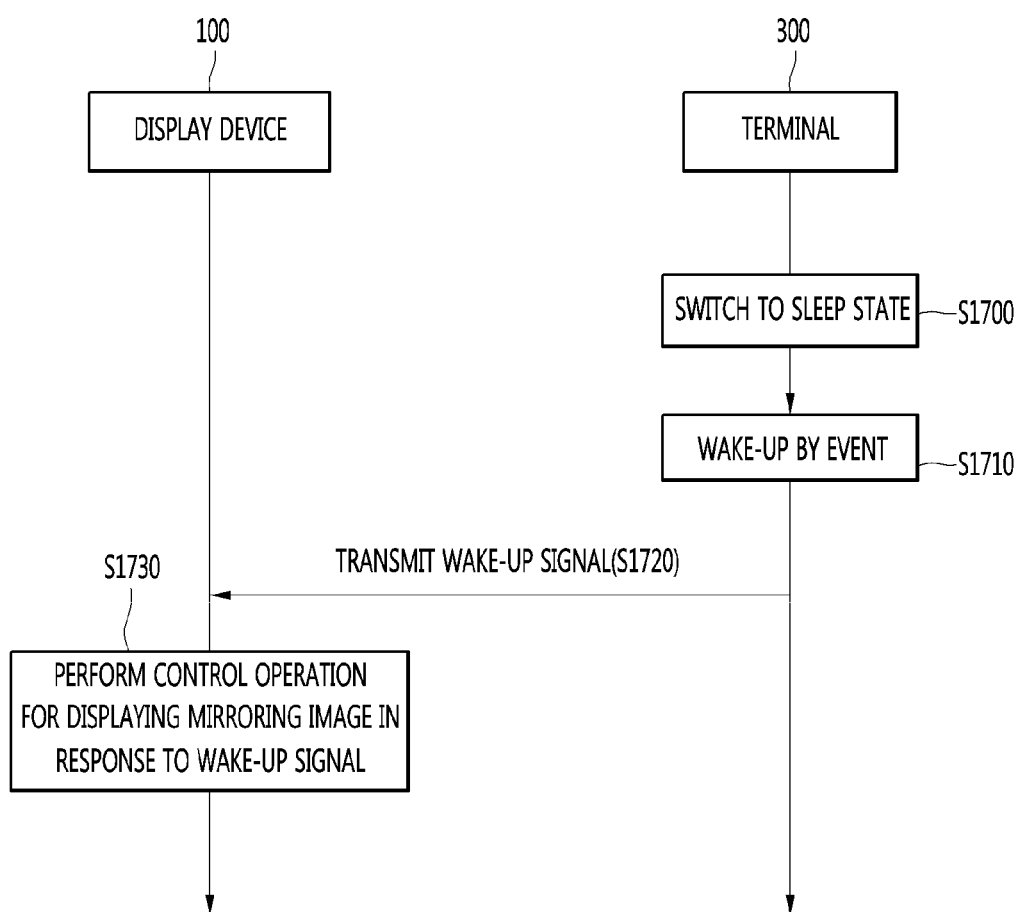

FIGS. 16 and 17 are flowcharts illustrating embodiments of an operation that the OLED display device changes the non-display state of the mirroring image according to the embodiments of FIGS. 10 to 15 to the display state.

Referring to FIG. 16, the display device 100 may acquire the APL of a mirroring image received from the terminal 300 (S1600).

In other words, even when the state of the mirroring image is the non-display state, the screen mirroring function is not terminated. Accordingly, the display device 100 may continuously receive the mirroring data from the terminal 300. The controller 170 may acquire the APL of the mirroring image based on the received mirroring image data (for example, may acquire the APL at a predetermined interval).

The display device 100 may calculate an APL variation between the acquired APL and the previously-acquired APL (S1610), and may perform a control operation such that the mirroring image is displayed (S1630) when the calculated APL variation exceeds the reference variation (or is equal to or greater than the reference variation) (see YES of S1620).

For example, when the user may operate the terminal 300 or when an event occurs in the terminal 300, the screen of the terminal 300 may be changed. In this case, the APL of the mirroring image may be varied and the controller 170 may change the non-display state of the mirroring image to the display state in response to the variation in the APL.

Referring to FIG. 17, the terminal 300 may be switched to a sleep state when there is absent the operation of the terminal 300 by the user or when the event does not occur for a predetermined time (S1700). The sleep state may refer to the state that the terminal 300 may not transmit the mirroring image data to the display device 100 or may not perform other functions.

When a specific event occurs in the sleep state, the terminal 300 may be switched to a wake-up state (S1710). For example, the terminal 300 in the sleep state may be switched to the wake-up state due to user input or other events.

As the terminal 300 is switched to the wake-up state, the terminal 300 may transmit the wake-up signal to the display device 100 (S1720). The display device 100 may perform a control operation such that the mirroring image is displayed, in response to the wake-up signal (S1730).

That the terminal 300 is switched to the wake-up state may refer to that the terminal 300 performs a specific operation. In this case, the display device 100 may determine that the terminal 300 operates and thus may change the mirroring image from the non-display state to the display state.

In other words, the display device 100 may display the mirroring image on the display unit 180 in response to the wake-up signal received from the terminal 300 as the state of the terminal 300 is changed.

Figure 18:
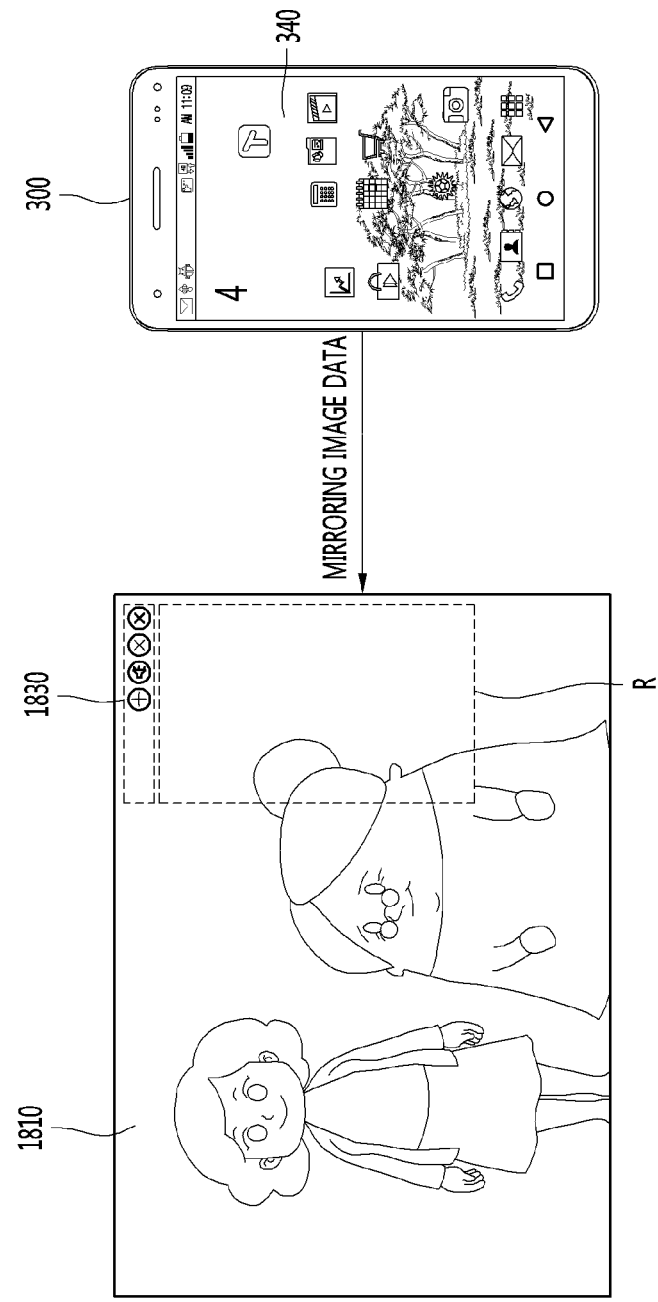
FIGS. 18 and 19 are views related to the operation of the OLED display device illustrated in FIGS. 16 to 17.
Figure 19:
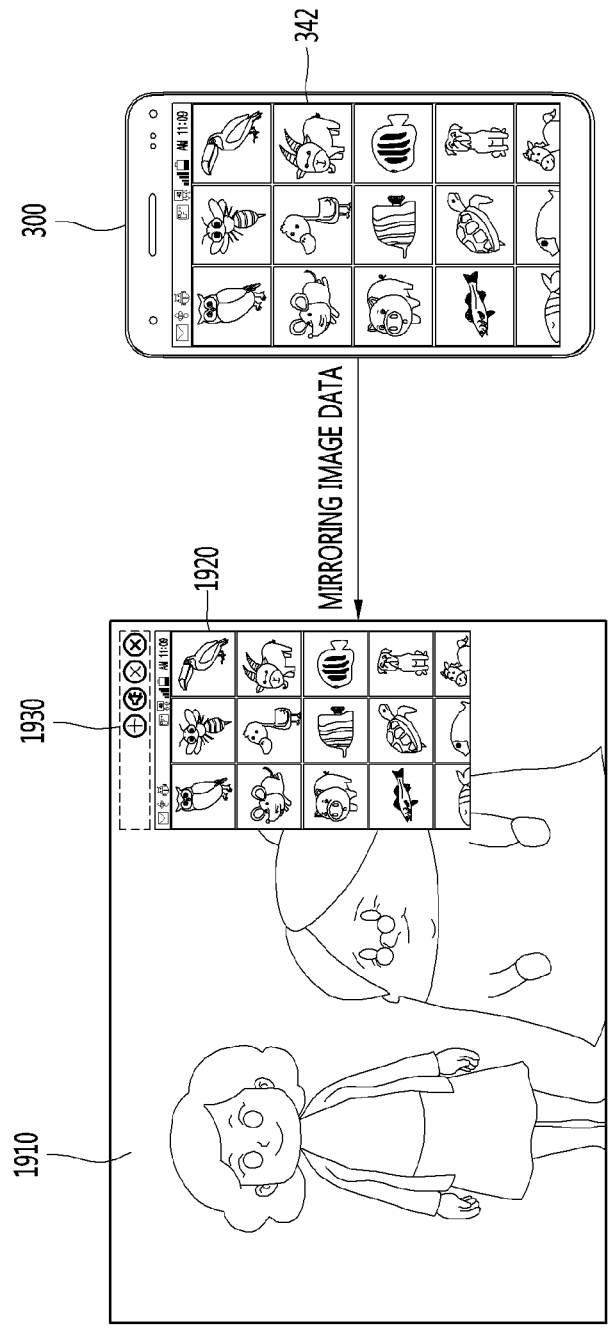

FIGS. 18 and 19 are views related to the operation of the OLED display device illustrated in FIGS. 16 to 17.

Referring to FIG. 18, the display device 100 may continuously receive the mirroring image data corresponding to the screen 340 which is being displayed on the terminal 300 from the terminal 300 when the screen mirroring function is not terminated as if the mirroring image is in the non-display state. The controller 170 may display a portion of the broadcast image 1810 without displaying the mirroring mage on the region R in which the mirroring image is displayed, since the mirroring image is in the non-display state.

Referring to FIG. 19, the user may execute a specific application (e.g., a gallery application) by operating the terminal 300. As the terminal 300 executes the specific application, the screen 342 displayed on the terminal 300 may be changed.

In this case, the mirroring image data transmitted by the terminal 300 may be changed. The controller 170 of the display device 100 may acquire an APL from the received mirroring image data and may compare the acquired APL with the previously-acquired APL. In this case, the APL variation may be higher than the reference variation, and the controller 170 may change the mirroring image 1920 from the non-display state to the display state by determining that the terminal 300 operates. Accordingly, the mirroring image 1920 may be displayed on the display unit 180.

According to an embodiment, the terminal 300 may be changed from the sleep state to the wake-up state as a specific application is executed by the user. In this case, the terminal 300 may transmit the wake-up signal to the display device 100. The controller 170 may change the mirroring image 1920 from the non-display state to the display state in response to the wake-up signal received from the terminal 300 and thus may display the mirroring image 1920 on the display unit 180.

Figure 20:
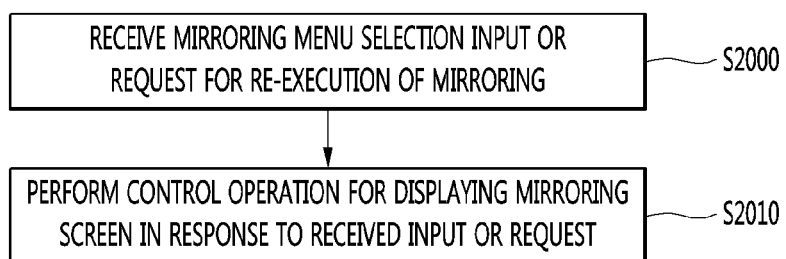
FIG. 20 is a flowchart illustrating embodiments of an operation that the OLED display device changes the non-display state of the mirroring image according to the embodiments of FIGS. 10 to 15 to the display state.
Figure 21:
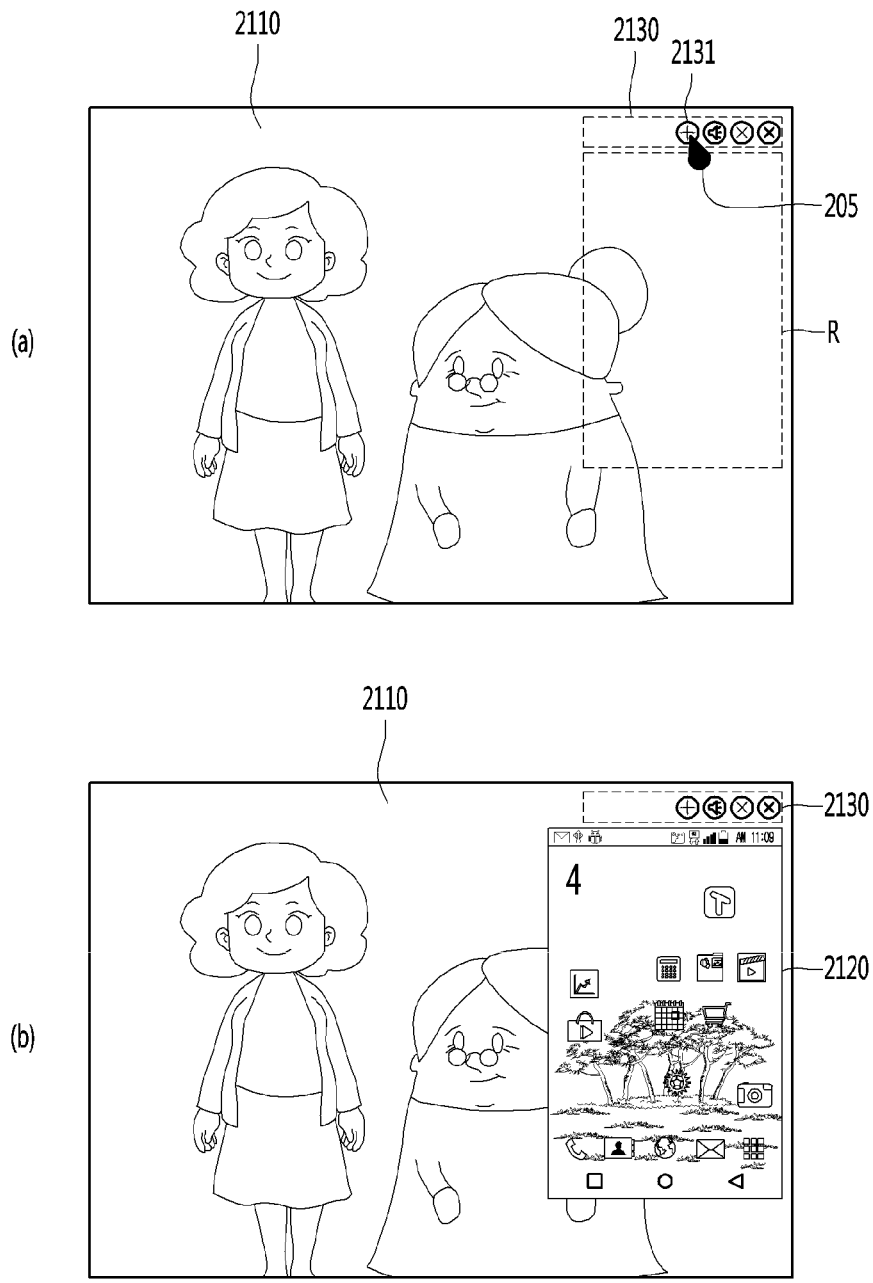
FIG. 21 is a view related to the operation of the OLED display device illustrated in FIG. 20.

FIG. 20 is a flowchart illustrating embodiments of an operation that the OLED display device changes the non-display state of the mirroring image according to the embodiments of FIGS. 10 to 15 to the display state. FIG. 21 is a view related to the operation of the OLED display device illustrated in FIG. 20.

Referring to FIG. 20, the display device 100 may receive an input for selecting a mirroring menu displayed on the display unit 180 or may receive a request for the re-execution of a screen mirroring function (S2000). In this case, the display device 100 may perform a control operation such that the mirroring screen is displayed (S2010).

Referring to FIG. 21A in this connection, the controller 170 of the display device 100 may display the mirroring menu 2130 on the display unit 180 when the screen mirroring function is not terminated as if the mirroring image is in the non-display state.

For example, when a mirroring image, which has been displayed on the specific region R of the display unit 180, is not displayed, the user may control the remote control device 200 to move a pointer 205 to the region in which a mirroring menu 2130 is displayed and to select a specific menu icon 2131. The controller 170 may switch the mirroring image 2120 from the non-display state to the display state as illustrated in FIG. 21B in response to the input for selecting a specific menu icon 2131 and thus the mirroring image 2120 may be displayed on the display unit 180.

In other words, according to the embodiment illustrated in FIGS. 16 to 21, the display device 100 may automatically change the state of the mirroring image to the display state based on the APL of the mirroring image or may change the state of the mirroring image to the display state through the simple manipulation of the user, thereby increasing the convenience of the user.

According to various embodiments of the present disclosure, the OLED display device may change the state of the mirroring image to the non-display state when the APL of the mirroring image is not changed for a predetermined time. Accordingly, since the OLED elements positioned in the region in which the mirroring image is displayed may display the broadcast image having a varied APL instead of continuously emitting the same light as the mirroring image is not changed for a long time, the OLED elements may have a lifespan reduction degree approximate to that of OLED elements present in another region. Accordingly, the afterimage phenomenon occurring on the display unit due to the lifespan difference between OLED elements may be prevented.

In particular, as the brightness of the mirroring image is increased, the lifespan difference between OLED elements may be increased. Accordingly, the OLED display device may change the state of the mirroring image to the non-display state based on the APL variation when the APL of the mirroring image is equal to greater than a predetermined level. Accordingly, the effect of preventing the afterimage phenomenon may be maximized.

In addition, the OLED display device may automatically change the mirroring image to the display state based on the APL of the mirroring mage or the state of the terminal or may change the state of the mirroring image to the display state through the simple manipulation of the user. Accordingly, the convenience of the user may be increased.

According to an embodiment of the present disclosure, the above-described method is able to be implemented with codes allowing a processor to be readable a medium having a program. The processor-readable medium may include a ROM, a RAM, a CD-ROM, a magnetic tape, a floppy disc, an optical data storage device, or the like.

The above-described display device does not limitedly employ the elements and the methods according to the above embodiments, but various modifications are possible and the whole embodiments or a part of the embodiments may be selectively combined with each other.

What is claimed is:

1. An organic light emitting diode (OLED) display device comprising:
    a communication unit configured to connect with a terminal;
    a display unit including pixels constituted by OLEDs; and
    a controller configured to:
    receive mirroring image data, which corresponds to a screen displayed on the terminal, through the communication unit,
    control the display unit to display a mirroring image on an area of the display unit based on the received mirroring image data, and
    control the display unit not to display the displayed mirroring image on the area based on an average picture level (APL) of the displayed mirroring image.

2. The OLED display device of claim 1, wherein the controller is configured to:
    acquire an APL of a frame of the mirroring image from the mirroring image data,
    calculate an APL variation by comparing the acquired APL with a previously-acquired APL, and
    control the display unit not to display the displayed mirroring image, based on the calculated APL variation.

3. The OLED display device of claim 2, wherein the controller is configured to:
    control the display unit to maintain displaying the mirroring image when the acquired APL is less than the reference APL, and
    control the display unit not to display the displayed mirroring image, based on the APL variation when the acquired APL is equal to or greater than a reference APL.

4. The OLED display device of claim 2, wherein the controller is configured to:
    acquire an APL at a predetermined frame interval of the mirroring image, and
    control the display unit not to display the displayed mirroring image, when maintaining, for a threshold time, a state that the APL variation between the acquired APL and the previously-acquired APL is less than a reference variation.

5. The OLED display device of claim 4, wherein the controller is configured to:
    display a broadcast image, which is received from a broadcast reception unit, on the display unit,
    display the mirroring image by overlaying the mirroring image with the area of the broadcast image, and
    display an overlaid portion of the broadcast image on the area, by controlling the display unit not to display the mirroring image displayed on the area.

6. The OLED display device of claim 5, wherein the controller is configured to:
    adjust a transparency of the mirroring image, based on a time for maintaining the state that the APL variation is less than the reference variation.

7. The OLED display device of claim 4, wherein the controller is configured to:
    display a broadcast image, which is received from a broadcast reception unit, on a first region of the display unit,
    display the mirroring image on the area which is not overlapped with the first region of the display unit, and
    increase a size of the first region and reduces a size of the area as a time for maintaining the state that the APL variation is less than the reference variation is increased.

8. The OLED display device of claim 4, wherein the controller is configured to:
    display a broadcast image, which is received from a broadcast reception unit, on a first region of the display unit;
    display the mirroring image on the area which is not overlapped with the first region of the display unit, and
    display a screen protection image on the area, when the controller controls the display unit not to display the mirroring image on the area.

9. The OLED display device of claim 2, wherein the controller is configured to:
    periodically acquire an APL of the mirroring image,
    increase a count when an APL variation between the acquired APL and the previously-acquired APL is less than a reference variation, and
    control the display unit not to display the displayed mirroring image, when the count arrives at a threshold count or exceeds the threshold count.

10. The OLED display device of claim 1, wherein the controller is configured to:
    when controlling the display unit not to display the displayed mirroring image, acquire an APL of the mirroring image at a predetermined frame interval based on the mirroring image data received from the terminal, and control the display to display the mirroring image on the area, based on an APL variation between the acquired APL and the previously-acquired APL.

11. The OLED display device of claim 1, wherein the controller is further configured to:

when controlling the display unit not to display the displayed mirroring image, control the display unit to display the mirroring image, in response to a wake-up signal received from the terminal as a state of the terminal is changed.

12. The OLED display device of claim 1, wherein the controller is further configured to:

display a mirroring menu on the display unit, and after controlling the display unit not to display the displayed mirroring image, control the display unit to display the mirroring image in response to a selection input of the mirroring menu.

13. A method for operating an OLED display device, the method comprises:

receiving mirroring image data, which corresponds to a screen displayed on a terminal connected with the OLED display device, from the terminal;

controlling the display unit to display a mirroring image on an area of the display unit based on the received mirroring image data; and controlling the display unit not to display the displayed mirroring image, based on an APL of the mirroring image.

14. The method of claim 13, wherein the controlling the display unit not to display the displayed mirroring image includes:

acquiring an APL of a frame of the mirroring image from the mirroring image data;

calculating an APL variation by comparing the acquired APL with a previously-acquired APL; and controlling the display unit not to display the displayed mirroring image, based on the calculated APL variation.

15. The method of claim 14, wherein the controlling the display unit not to display the displayed mirroring image, based on the calculated APL variation includes:

controlling the display unit not to display the displayed mirroring image, based on the APL variation when the acquired APL is equal to or greater than a reference APL; and controlling the display unit to maintain displaying the mirroring image when the acquired APL is less than the reference APL.

16. The method of claim 14, wherein the acquiring of the APL of the frame of the mirroring image includes:

acquiring an APL at a predetermined frame interval of the mirroring image, and wherein the controlling the display unit not to display the displayed mirroring image, based on the calculated APL variation includes:

controlling the display unit not to display the displayed mirroring image, when maintaining, for a threshold time, a state that the APL variation is less than a reference variation.

17. The method of claim 16, wherein controlling the display unit to display the mirroring image on the area includes:

displaying a broadcast image, which is received from a broadcast reception unit, on the display unit; and displaying the mirroring image by overlaying the mirroring image with the area of the broadcast image, and wherein the controlling the display unit not to display the displayed mirroring image includes:

displaying an overlaid portion of the broadcast image on the area.

18. The method of claim 13, wherein the controlling the display unit not to display the displayed mirroring image further includes:

acquiring an APL of the mirroring image at a predetermined frame interval based on the mirroring image data received from the terminal; and controlling the display unit to display the mirroring image, when an APL variation between the acquired APL and the previously-acquired APL is equal to or greater than a reference variation.

19. The method of claim 13, wherein the controlling the display unit not to display the displayed mirroring image further includes:

controlling the display unit to display the mirroring image, in response to a wake-up signal received from the terminal as a state of the terminal is changed.

20. The method of claim 13, wherein the controlling the display unit to display the mirroring image further includes:

displaying a mirroring menu on the display unit, and wherein the controlling the display unit not to display the displayed mirroring image further includes:

controlling the display unit to display the mirroring image in response to a selection input of the mirroring menu.

* * * * *